United States Patent
Ishii et al.

(10) Patent No.: US 9,213,360 B2
(45) Date of Patent: Dec. 15, 2015

(54) TIME SETTING SYSTEM AND TIME SETTING METHOD

(75) Inventors: Tamotsu Ishii, Saitama (JP); Hiroshi Kuno, Kanagawa (JP); Shunichi Soma, Chiba (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1768 days.

(21) Appl. No.: 11/115,335

(22) Filed: Apr. 27, 2005

(65) Prior Publication Data

US 2005/0251603 A1 Nov. 10, 2005

(30) Foreign Application Priority Data

Apr. 27, 2004 (JP) .................. 2004-131772

(51) Int. Cl.
*G06F 1/14* (2006.01)
*H04J 3/06* (2006.01)
*H04L 29/06* (2006.01)

(52) U.S. Cl.
CPC .................. *G06F 1/14* (2013.01); *H04J 3/0667* (2013.01); *H04L 69/28* (2013.01)

(58) Field of Classification Search
CPC ........... G06F 1/14; G06F 13/00; H04L 69/28; H04J 3/0667
USPC ........................................................ 709/248
See application file for complete search history.

(56) References Cited

U.S. PATENT DOCUMENTS

| | | | | |
|---|---|---|---|---|
| 5,428,645 A | * | 6/1995 | Dolev et al. | 370/507 |
| 6,175,604 B1 | * | 1/2001 | Noro et al. | 370/514 |

(Continued)

FOREIGN PATENT DOCUMENTS

| | | |
|---|---|---|
| JP | 2001-298465 | 10/2001 |
| JP | 2002-116694 | 4/2002 |

(Continued)

OTHER PUBLICATIONS

C.R. Snow, "A Multi-protocol Campus Time Server", Software-Practice and Experience, vol. 21, No. 9, XP-000276339, Sep. 1, 1991, pp. 907-922.

(Continued)

*Primary Examiner* — Ebrahim Golabbakhsh
(74) *Attorney, Agent, or Firm* — Oblon, McClelland, Maier & Neustadt, L.L.P.

(57) ABSTRACT

The present invention provides a time setting system and method thereof that are capable of correctly setting time if a delay occurs in the transmission of time information. In the system for setting a master time outputted from a master apparatus to a slave time of a slave apparatus that counts time independently of the master apparatus, the slave apparatus has transmission section for transmitting master time request information to the master apparatus via a network and the master apparatus has an allowable range information acquisition section for acquiring allowable range information indicative of an allowable time in which the master time may be set to the slave time of the slave apparatus and transmission section for transmitting the master time and allowable range information to the slave apparatus. The slave apparatus obtains a time difference between a first slave time to be obtained before or after the transmission of master time request information and a second slave time to be obtained at reception of the master time and the allowable range information. If the allowable time is greater than the obtained time difference, the master time is set.

5 Claims, 13 Drawing Sheets

(56) References Cited

U.S. PATENT DOCUMENTS

| | | | |
|---|---|---|---|
| 6,438,702 B1 * | 8/2002 | Hodge | 713/400 |
| 6,674,730 B1 * | 1/2004 | Moerder | 370/508 |
| 2005/0060315 A1 * | 3/2005 | Sanin | 707/9 |

FOREIGN PATENT DOCUMENTS

| | | |
|---|---|---|
| JP | 2002-190805 | 7/2002 |
| JP | 2003-101530 | 4/2003 |
| WO | WO 01/95550 A2 | 12/2001 |
| WO | WO 02/054661 A1 | 7/2002 |

OTHER PUBLICATIONS

David L. Mills, "Network Time Protocol Specification (Version 3) Implementation and Analysis", IETF Standard, Internet Engineering Task Force, Request for Comments: 1305, Obsoletes, RFC-1119, RFC-1059, RFC-958, XP-015007092, Mar. 1992, the Whole Document.

* cited by examiner

FIG.11

| USER ID 2161 | CREDIT CARD NUMBER 2162 | SERVICE ID 2163 | GROUP ID 2164 | VALID PERIOD INFORMATION 2166 START TIME | 2165 END TIME | DEVICE ID 2167 2168 |
|---|---|---|---|---|---|---|
| Yamada Taro (USER A) | xxx-xxxx | α | GROUP ID-A1 | 2004.1.1 00:00:00 | 2005.1.1 00:00:00 | TERMINAL ID1 |
| | | | | | | TERMINAL ID2 |
| | | | | | | TERMINAL ID3 |
| | | β | GROUP ID-A2 | 2004.4.5 12:35:00 | 2004.5.5 12:35:00 | TERMINAL ID1 |
| | | | | | | TERMINAL ID2 |
| | | γ | GROUP ID-A3 | 2004.7.8 11:11:11 | 9999.12.31 00:00:00 | TERMINAL ID2 |
| | | | | | | TERMINAL ID3 |
| Suzuki Jiro (USER B) | ooo-oooo | γ | GROUP ID-B1 | 2003.4.4 23:59:59 | 9999.12.31 00:00:00 | TERMINAL ID10 |
| | | | | | | TERMINAL ID11 |
| | | θ | GROUP ID-B2 | 2003.4.4 23:59:59 | 9999.12.31 00:00:00 | TERMINAL ID10 |
| | | | | | | TERMINAL ID12 |
| ... | ... | ... | ... | | | ... |

TIME SETTING SYSTEM AND TIME SETTING METHOD

BACKGROUND OF THE INVENTION

The present invention relates to a time setting system and a time setting method.

Content distribution services are known in which the use or reproduction, by users, of various kinds of content data such as software, movie data, and music data, for example, distributed via a network, is restricted with respect to time.

With these content distribution services, each user is able to select desired content data, download the selected content data, and reproduce the downloaded content data if it is before its expiration date.

In distributing content data such as music data and movie data via a network with restriction imposed on use or reproduction of the content, it is essential to control time between the destination (a client for example) of distribution and the source (a server for example) for the correct management of the expiration date of the content.

With related-art technologies, the NTP protocol (RFC1305: Internet <URL http://www.faqs.org/rfcs/rfc1305.html>) or the SNTP protocol (RFC1769: Internet CURL http://www.faqs.org/rfcs/rfc1769.html>) for example to provide time synchronization between the source and destination of distribution, thereby transmitting the time information of the distribution source for timing correct time to the distribution destination to set the time thereof to the time provided by the distribution source.

However, with the related-art technologies, if an illegal interference is made against the transmission of time information to delay the arrival of the time information at the destination of distribution, for example, a correct time setting cannot be provided due to the delay.

SUMMARY OF THE INVENTION

It is therefore an object of the present invention to a novel and improved time setting system and time setting method that are capable of avoiding time setting if a delay occurs in the transmission of time information.

In carrying out the invention and according to one aspect thereof, there is provided a time setting system for setting a master time set to master time information that is outputted by a master apparatus by counting time to a slave time of a slave apparatus that counts time independently of the master apparatus. The slave apparatus has slave time counting section for outputting slave time information to which the slave time is set; and transmission section for transmitting master time request information to the master apparatus via a network. The master apparatus has master time counting section for outputting the master time information; allowable range information acquisition section for acquiring allowable range information indicative of an allowable time in which the master time may be set to the slave time of the slave apparatus; and transmission section for transmitting the master time and the allowable range information to the slave apparatus via a network. The slave apparatus obtains a time difference between a first slave time to be obtained before or after the transmission of the master time request information and a second slave time to be obtained at reception of the master time information and the allowable range information and, if the allow time is greater than the time difference, the master time is set to the slave time. It should be noted that at least one of the master time counting section and the slave time counting section is tamper proof.

In carrying out the invention and according to another aspect thereof, there is provided a time setting method for setting a master time set to master time information that is outputted by a master apparatus by counting time to a slave time of a slave apparatus that counts time independently of the master apparatus. This time setting method has the steps of: acquiring first slave time information to which first slave time is set on the side of the slave apparatus; transmitting master time request information for requesting the master time information from the slave apparatus to the master apparatus via a network; acquiring, upon reception of the master time request information, master time information to which a master time is set on the side of the master apparatus and allowable range information indicative of an allowable time in which the master time may be set to the slave time of slave apparatus; transmitting the master time information and the allowable range information from the master apparatus to the slave apparatus via a network; and acquiring second slave time information to which a second slave time at the time of reception by the slave apparatus of the master time information and the allowable range information is set. The time setting method obtains a time difference between the first slave time and the second slave time and, if, as a result of comparison between the time difference and the allowable time, the allowable time is greater than the time difference, sets the master time to the slave time.

According to the invention, in setting a master time counted by the master apparatus to a slave time counted by the slave apparatus, the setting of master time is enabled or disabled on the basis of an allowable time up to the setting of the master time to the slave time of the slave apparatus. This novel configuration prevents any attempt to execute illegal time setting, such as setting the master time in excess of an allowable time for example. Consequently, the correct time may be set to the slave apparatus. It should be noted that the master time information in excess of the allowable time is discarded for example and therefore not set to the slave apparatus.

The slave apparatus may transmit master time request information to the master apparatus via a network at every predetermined interval.

A first slave apparatus connected to a network may reference time setting status information held in a second slave apparatus at every predetermined interval and, if the time setting status information is found having no predetermined flag, transmit master time request information to the master apparatus.

When the second slave apparatus is connected to the first slave apparatus connected to the network, the first slave apparatus may reference time setting status information held in the second slave apparatus.

The master time request information may be attached with an electronic signature for authenticating the slave apparatus and the electronic signature may contain slave apparatus identification information generated on the basis of random numbers.

The master apparatus may transmit the electronic signature and the master time information received from the slave apparatus to the slave apparatus via the network, and the slave apparatus may check to see if there is a match between identification information generated at transmission of the master time request information and identification information contained in the electronic signature transmitted from the master apparatus. If a mismatch is found, this configuration prevents erroneous time setting.

The master time request information may be encrypted by one of a public key encryption algorithm and a common key encryption algorithm. This configuration prevents easy referencing of the contents of intercepted master time request information, if any.

When allowable range information and master time information are separately transmitted from the master apparatus to the slave apparatus and the allowable range information is received, the second slave time information may be acquired. This configuration of data transmission in a distributed manner enhances the efficiency of processing.

The transmission of data from the slave apparatus to the master apparatus may be delayed in time by an amount equivalent to a random value after the acquisition of time information. This configuration prevents the illegal delayed transmission from the slave apparatus to the master apparatus.

The master time request information may contain first slave time information. The above-mentioned allowable range information may be at least of round trip time. The master apparatus may be at least a distribution server for distributing content data.

The allowable range information may be configured so that an allowable time is set at least in unit of content or in unit of service form in which content concerned is distributed. The predetermined flag may be a reliability flag for guaranteeing the slave time counted by the slave apparatus is a correct time free of illegal falsification. If the time difference between the first slave time and the second slave time is equal to the allowable time, the master time may be set. The time counting section may be tamper proof.

As described and according to the invention, any attempts to illegally set time, such as setting time by delaying the reception of time information, may be prevented.

BRIEF DESCRIPTION OF THE DRAWINGS

FIG. 11 is a diagram approximately illustrating an exemplary data structure of a user information database associated with the third embodiment;

DETAILED DESCRIPTION OF THE PREFERRED EMBODIMENTS

Figure 1:
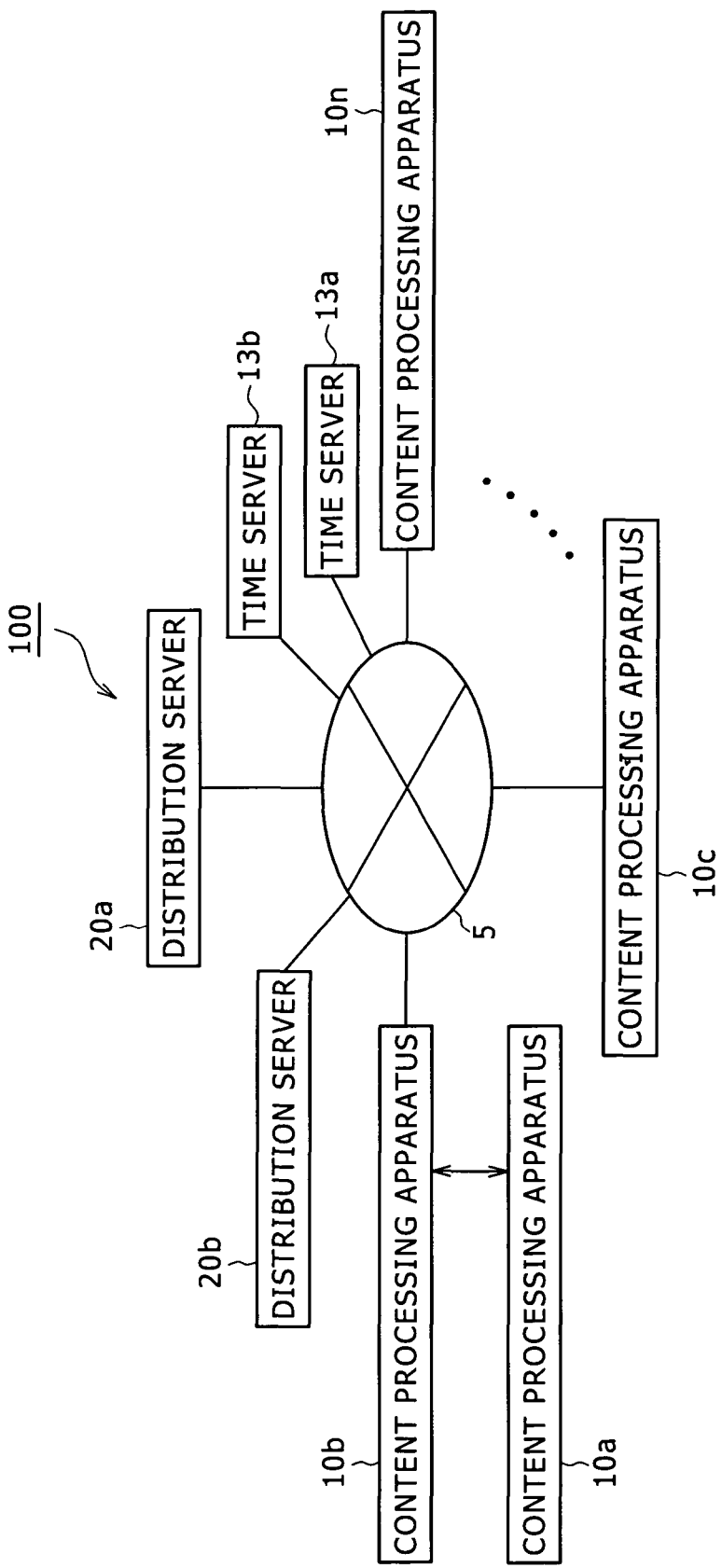
FIG. 1 is a schematic diagram approximately illustrating an exemplary overall configuration of a time setting system practiced as a first embodiment of the invention.

The following describes in detail the preferred embodiments of the invention with reference to accompanying drawings. It should be noted that, in the following description and the accompanying drawings, components having similar functions and configurations are denoted by same reference numerals and the duplicate description of the similar components will be skipped for the purpose of brevity.

(Time Setting System 100)

First, with reference to FIG. 1, an overall configuration of a time setting system practiced as a first embodiment of the invention will be described. FIG. 1 is a block diagram approximately illustrating the overall configuration of this time setting system.

As shown in FIG. 1, the time setting system 100 practiced as the first embodiment has at least a plurality of content processing apparatuses 10a, 10b, . . . , 10n (hereafter generically referred to also as a content processing apparatus 10), a plurality of time servers 13a, 13b, and so on, a plurality of distribution servers 20a, 20b, and so on, and a network 5 through which these components are interconnected, for example.

It should be noted that, as shown in FIG. 1, the time setting system 100 will be described with the time server 13 and the distribution server 20 arranged separately from each other; alternatively, however, the time server 13 and the distribution server 20 may be integrated in one unit, for example.

The content processing apparatus 10 (for example, a slave apparatus) is any of various types of recording/reproducing apparatus, a recording-only apparatus, or a reproduction-only apparatus that is capable of recording and/or reproducing content data such as video data and/or audio data with a storage unit such as a hard disk drive incorporated in the content processing apparatus 10. To be more specific, the content processing apparatus 10 may be made up of a computer such as a personal computer (of portable type or desktop type), a PDA (Personal Digital Assistant), a portable video player/recorder, an audio player/recorder such as an IC recorder, an imaging device such as a digital camera or video recorder, a home game machine, a VTR, CD or DVD recorder/player, a radio set, a mobile phone, or a home information appliance, for example.

The content processing apparatus 10 is capable of newly creating content and recording the created content by self recording (audio or video recording) or ripping. It should be noted that self recording denotes the recording of audio data and/or video data picked up by a sound pickup device or imaged by an imaging device of the content processing apparatus 10 itself. Ripping denotes the extraction of the digital content data (audio data and video data for example) from recording media such as music CD, video DVD, and so on, and the recording of the extracted digital content data in a file format that can be processed by computers for example.

The content processing apparatus 10 is also capable of recording the content data distributed from the distribution server 20 to recording means such as a storage unit and recording media including CD, CD-ROM, or Blu-ray Disc, for example.

Further, the content processing apparatus 10 is capable of transmitting and receiving the content data created or distributed as described above with other content processing apparatuses 10 via the network 5 or via the above-mentioned recording media. Consequently, content data may be provided and or acquired between a plurality of content processing apparatuses 10, thereby sharing content data.

Also, the content processing apparatus 10 is capable of reproducing the content data created or distributed as described above. In addition, the content processing apparatus 10 is capable of reproducing the content data acquired from another content processing apparatus 10 if the content data is permitted for reproduction.

The distribution server 20 is used to provide content distribution services such as EMD (Electronic Music Distribution) service for example and is based on a computer having server capabilities for example. The distribution server 20 is capable of distributing content data to the above-mentioned content processing apparatus 10 that is a client via the network 5. In the distribution of music content, the distribution server 20 compresses the content data by the MP3 (MPEG Audio Layer-3) standard for example before distribution.

The time server 13 (for example, a master apparatus) outputs correct and reliable time in response to a request from a client such as the content processing apparatus 10 for example. The time of the time server 13 provides the master, so to speak. The content processing apparatus 10 sets the time clocked by the time server 13 as a time inside the content processing apparatus 10. This reliable time information is used as decision information for checking if certain content is reproducible or not. It should be noted that clocking denotes the clocking of the current time; in other words, the clocking also includes the processing of counting time. Also, the time may be in unit of year, month, or day or in unit of hour or minute.

The network 5 is typically a public line network that is connected on the basis of ADSL (Asynchronous Digital Subscriber Line) or FTTH (Fiber To The Home) for example, also including a closed line network such as WAN, LAN, or IP-VPN, for example. The connection media include the optical fiber cable such as FDDI (Fiber Distributed Data Interface) for example, the coaxial or twisted-pair cable based on Ethernet (trademark), the wireless communication such as IEEE 802.11b, and the satellite communication network.

It should be noted that the network 5 includes a private network as described above. The private network denotes a network that interconnects a plurality of content processing apparatuses 10 that share content data within a scope of private use. Specific examples of this private network include a network for interconnecting a plurality of content processing apparatuses 10 for use by a same user, a home network for connecting a plurality of content processing apparatuses 10 for use in a same home, and a LAN for interconnecting a plurality of content processing apparatuses 10 of use in a small-scale, limited group (namely, particular companies or friends for example).

The time setting system 100 having the above-mentioned configuration is capable of setting the reliable time clocked by the time server 13 into each content processing apparatus 10 every time content data is provided or acquired (namely, copied) between a plurality of content processing apparatuses 10.

(Content Processing Apparatus 10)

Figure 2:
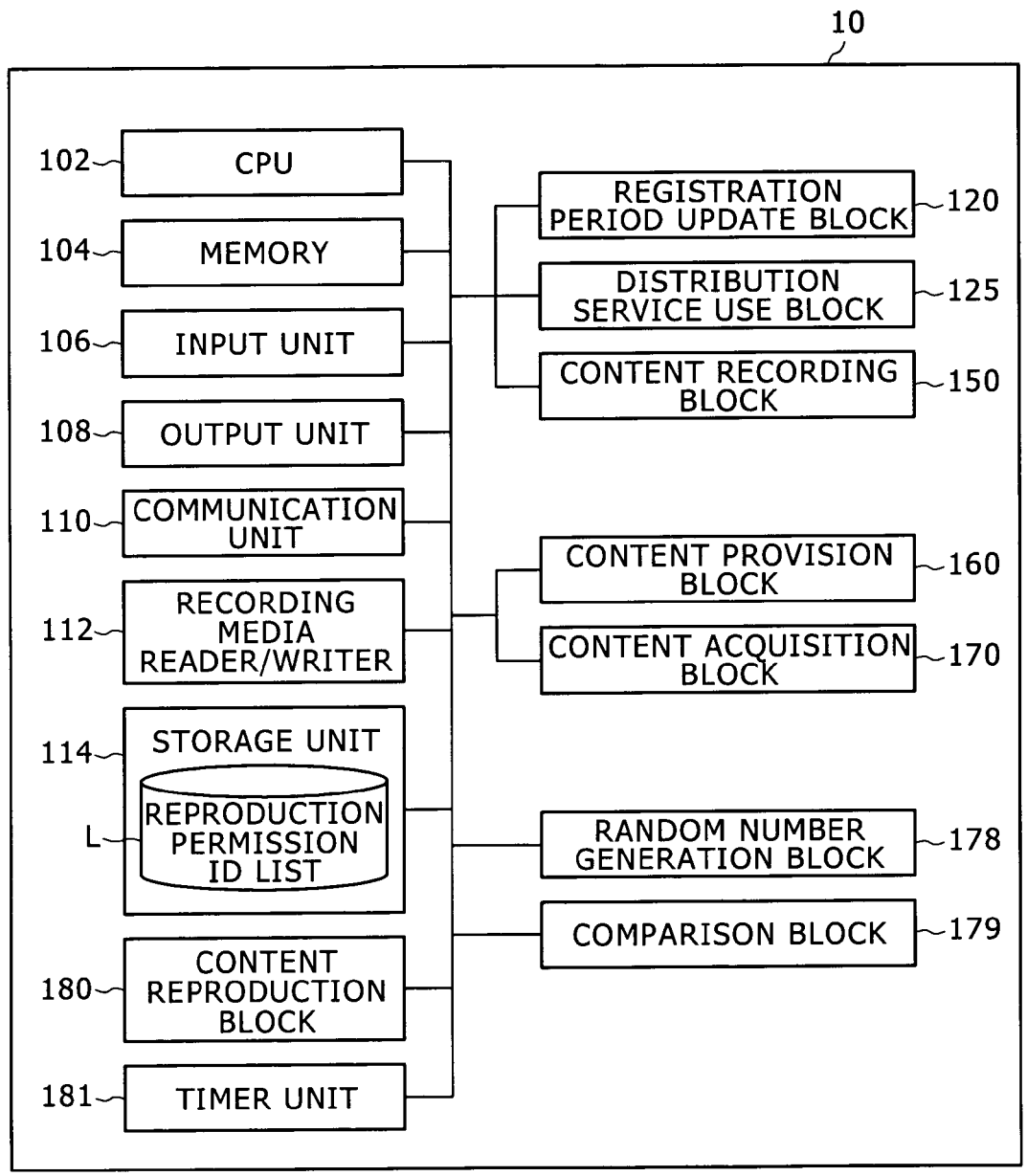
FIG. 2 is a block diagram approximately illustrating an exemplary configuration of a content processing apparatus associated with the first embodiment.

The following describes a detail configuration of the content processing apparatus 10 practiced as the first embodiment with reference to FIG. 2. FIG. 2 is a block diagram illustrating an exemplary configuration of the content processing apparatus 10.

As shown in FIG. 2, the content processing apparatus 10 has a CPU 102, a memory 104, an input unit 106, an output unit 108, a communication unit 110, a recording media reader/writer 112, a storage unit 114, a registration and expiration update block 120, a distribution service use block 125, a content recording block 150, a content provision block 160, a content acquisition block 170, a random number generation block 178, a comparison block 179, a content reproduction block 180, and a timer unit 181.

The CPU 102, functioning as a computation unit and a control unit, controls each of the components of the content processing apparatus 10. Also, the CPU 102 sets the time supplied from the time server 13 to the timer unit 181.

The memory 104 is based on a RAM, a ROM, or a cache memory and temporarily stores various kinds of data necessary for the processing by the CPU 102 and operation programs of the CPU 102.

The input unit 106 is made up of operation means such as mouse, keyboard, touch-sensitive panel, button, switch, and lever for example and an input control circuit that generates input signals and outputs the generated input signals to the CPU 102. The user of the content processing apparatus 10 operates the input unit 106 to enter various kinds of data into the content processing apparatus 10 and instruct the content processing apparatus 10 to execute desired processing operations.

The output unit 108 is made up of a display device such as CRT, LCD, and indicators and an audio output device such as loudspeaker, for example. The output unit 108 is capable of the content data reproduced by the content reproduction block 180. To be more specific, the display device displays the GUI screens for reproduced video data, electronic books, games, and various software programs. On the other hand, the audio output device sounds reproduced audio data. If the content processing apparatus 10 handles only audio data, the display devices are not required and, if the content processing apparatus 10 handles only video data, the audio output device is not required.

The communication unit 110 provides a communication interface configured by a communication line, a communication circuit, and a communication device, for example. The communication unit 110 is capable of transmitting and receiving content data, reproduction permission list L, control signals, and other various data with another content processing apparatus 10, the distribution server 20, and other external devices through the network 5 or a local cable which connects each content processing apparatus 10.

The recording media reader/writer 112 records and reproduces various data such as content data and a reproduction permission ID list to and from a recording medium such as CD-R. The recording media reader/writer 112 is constituted by a disk unit such as an optical disk drive if the recording medium is an optical disk for example or a semiconductor memory reader/writer if the recording medium is a semiconductor memory. It should be noted that the recording media reader/writer 112 may be incorporated in the content processing apparatus 10 or externally attached.

The storage unit 114 is a data storage unit constituted by a hard disk drive or a flash memory for example, storing various data such as programs and content data.

The storage unit 114 stores reproduction permission ID list L. This reproduction permission ID list L is a list of service IDs. The content data to which a service ID contained in this list is capable of being reproduced by the content reproduction block 180 of the content processing apparatus 10. Reproduction permission list L is stored as encrypted or signatured (namely, electronically or digitally signatured) so as to prevent the user from falsifying the list, for example. The service ID will be described in detail later in the description of license purchase processing.

Reproduction permission ID list L contains one or more service IDs sent from the distribution server 20 to the content processing apparatus 10 and the valid period information of that service ID.

Further, the storage unit 114 stores the own ID database 116 containing the device ID corresponding to the content processing apparatus 10. The device ID (a terminal ID for example) is an identifier that is assigned uniquely to each content processing apparatus 10 as described above, thereby uniquely identifying each content processing apparatus 10. This device ID and the recorder ID are securely stored in the own ID database 116 in an encrypted form before shipment from factory. Hence, the user owning the content processing apparatus 10 cannot falsify the device ID thereof.

The timer unit 181 generates and outputs correct time. If the power supply such as battery for clocking the time is disrupted, the timer unit 181 sets a flag indicative that unreliable, incorrect time to time setting status information.

This time setting status information is the register information held a register (not shown) arranged in the timer unit 181, the memory 104, or the CPU 102 for example. Also the time setting status information is the status information for guaranteeing the clocking of reliable time. If the reliable time is being clocked, the flag is set so as to indicate the status representative of reliable time. This flag provides the criterion by which to determine whether time setting is required or not.

It should be noted that the timer unit 181 is constituted by a reliable clock having tamper resistance and means for preventing falsification. Even if the user illegally falsifies the time information generated by the timer unit 181, referencing the above-mentioned time setting status information allows the setting of the correct time of the time server 13 again.

The tamper-proof timer unit 181 is a unit having a circuit/mechanism for preventing the user from illegally analyzing the LSI of the timer unit 181, interpreting its operation, and falsifying or forging the internally stored data.

The comparison block 179 obtains a differential time from the time (or time information) outputted from the timer unit 181, makes comparison between the obtained differential time and allowable range information TTL, determines, as a result of the comparison, whether or not to set the time received from the time server 13, and transmits the information to the CPU 301 indicative that the time is to be set.

The above-mentioned comparison block 179 is a software program made up of one or more modules that become executable when installed in the storage unit 114 beforehand. It should be noted that this software program may be a Java (trademark) applet that becomes executable when directly downloaded from a server, rather than installed in the storage unit.

The random number generation block 178 generates random numbers and outputs the generated random numbers as random number information (or random number SID). The random number generation block 178 is a hardware unit made up of one or more chips. Alternatively, the random number generation block 178 may be a software program that becomes executable when installed in the storage unit 114 beforehand or a Java (trademark) applet requiring no installation.

The registration and expiration update block 120 executes, for the distribution server 20, user registration request processing, content processing apparatus 10 additional registration request processing, and distribution service form add, stop, and change request processing, for example.

The distribution service use block 125 receives the distributed content data from the distribution server 20 via the network 5 and the communication unit 110. Namely, when the user of the content processing apparatus 10 purchases a license for the reproduction of content data, the distribution service use block 125 downloads the content data from the distribution server 20.

The content recording block 150 controls the storage unit 114 or the recording media reader/writer 112 for example to record the distributed content data received by the distribution service use block 125 and the content data acquired from the outside by the content acquisition block 170 to the storage unit 114 or the recording medium 7.

The content provision block 160 is capable of providing content data attached for example to an external content processing apparatus 10. The content acquisition block 170 is capable of receiving content data from an external content processing apparatus 10. The content provision block 160 and the content acquisition block 170 may execute these content data provision and acquisition by the transmission and reception processing via the network 5 or a local line or via a recording medium. It should be noted that, in the processing of transmitting and receiving content data, the time is checked for reliability. If the time is found not reliable, the time setting is executed.

The content reproduction block 180 is configured by the content reproduction software installed on a reproduction apparatus having content reproduction capabilities or the content processing apparatus 10 and is capable to reproducing various kinds of content data. The content data reproduced by this content reproduction block 180 is outputted from the above-mentioned output unit 108.

Further, the content reproduction block 180 has reproduction permission ID list L corresponding to itself in the storage unit 114 for example and, when reproducing content data attached with a group ID, controls the reproduction of the content data depending on whether that group ID is included in reproduction permission ID list L.

(Distribution Server 20)

Figure 3:
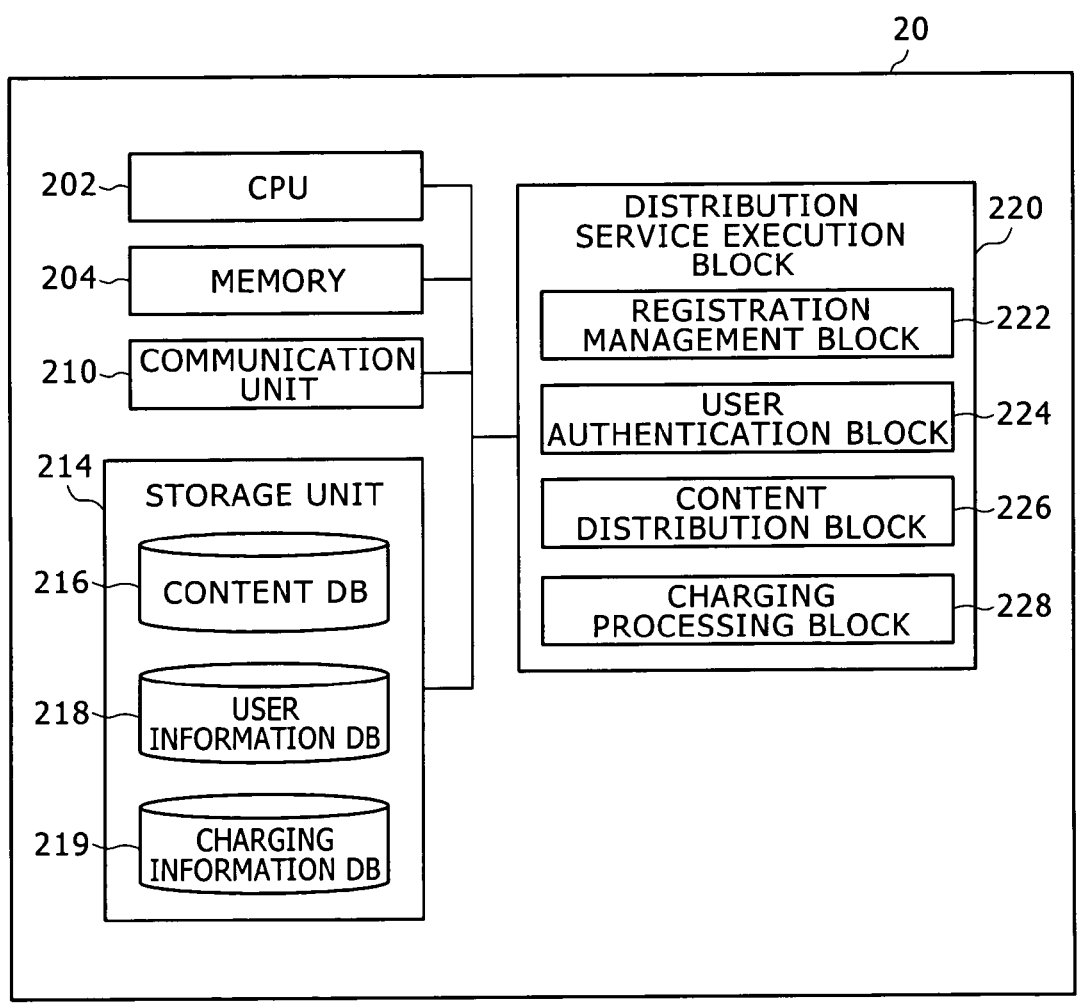
FIG. 3 is a block diagram approximately illustrating an exemplary configuration of a distribution server associated with the first embodiment.

The following describes in detail the distribution server 20 practiced as the first embodiment with reference to FIG. 3. FIG. 3 is a block diagram illustrating an exemplary configuration of the distribution server 20.

As shown in FIG. 3, the distribution server 20 has a CPU 202, a memory 204, a communication unit 210, a storage unit 214, and a distribution service execution block 220.

The CPU 202, functioning as a computation unit and a control unit, controls each of the components of the distribution server 20. The memory 204 is based on a RAM, a ROM, or a cache memory and temporarily stores various kinds of data necessary for the processing by the CPU 202 and operation programs of the CPU 202.

The communication unit 210 provides a communication interface based on a communication line, a communication circuit, an a communication device, for example. The communication unit 210 is capable of transmitting and receiving content data and various control signals with external devices such as the content processing apparatus 10 via the network 5.

The storage unit 214 is constituted by a hard disk drive for example and stores various kinds of data including programs. In addition, this storage unit 214 stores a user information database (DB) 218, a content database (content DB) 216, and a charging information database (DB) 219, for example.

The user information database 218 stores the user registration information, service registration information, device registration information, and service ID valid period information associated with content distribution service. The content database 217 stores a plurality of pieces of content data subject to content distribution service. The account information database 219 stores the charging information of each user.

The distribution service execution block 220 is a component for executing content distribution service for distributing content to the user of the content processing apparatus 10 on a chargeable basis for example. The distribution service execution block 220 is implemented by a content distribution service software program installed on the distribution server 20, for example.

The distribution service execution block 220 has a registration management block 222, an charging processing block 228, and a content distribution block 226 for example as shown in FIG. 3.

The registration management block 222 executes the processing of registering each user desiring the use of content distribution service, changing registration contents, and canceling registration. To be more specific, the registration management block 222 executes the processing of user authentication, selection and setting of distribution service form, adds or change distribution service form, and additional registration of the content processing apparatus 10, for example.

In addition, the registration management block 222 is capable of authenticating the user of the content processing apparatus 10 for example when the user makes the above-mentioned various requests or a request for connection for the purchase of content. This user authentication processing is executed on the basis of the user account information entered by the user and the user account information stored in the user information database 218, for example. Once authorized, the user is able to log in on the content distribution block 226 for example.

The charging processing block 228 executes charging processing for billing the user of each content distribution service for the fee thereof in accordance with each distribution service form set as described above. Such charging information generated by this charging processing as amount billed, settlement method, and settlement date is stored in the charging information database 219 for example.

The content distribution block 226 lets the authenticated user browse a list of distributable content data and select desired distributed content data. Further, the content distribution block 226 distributes the selected content data to the content processing apparatus 10 of that user via the network 5.

(Time Server 13)

Figure 4:
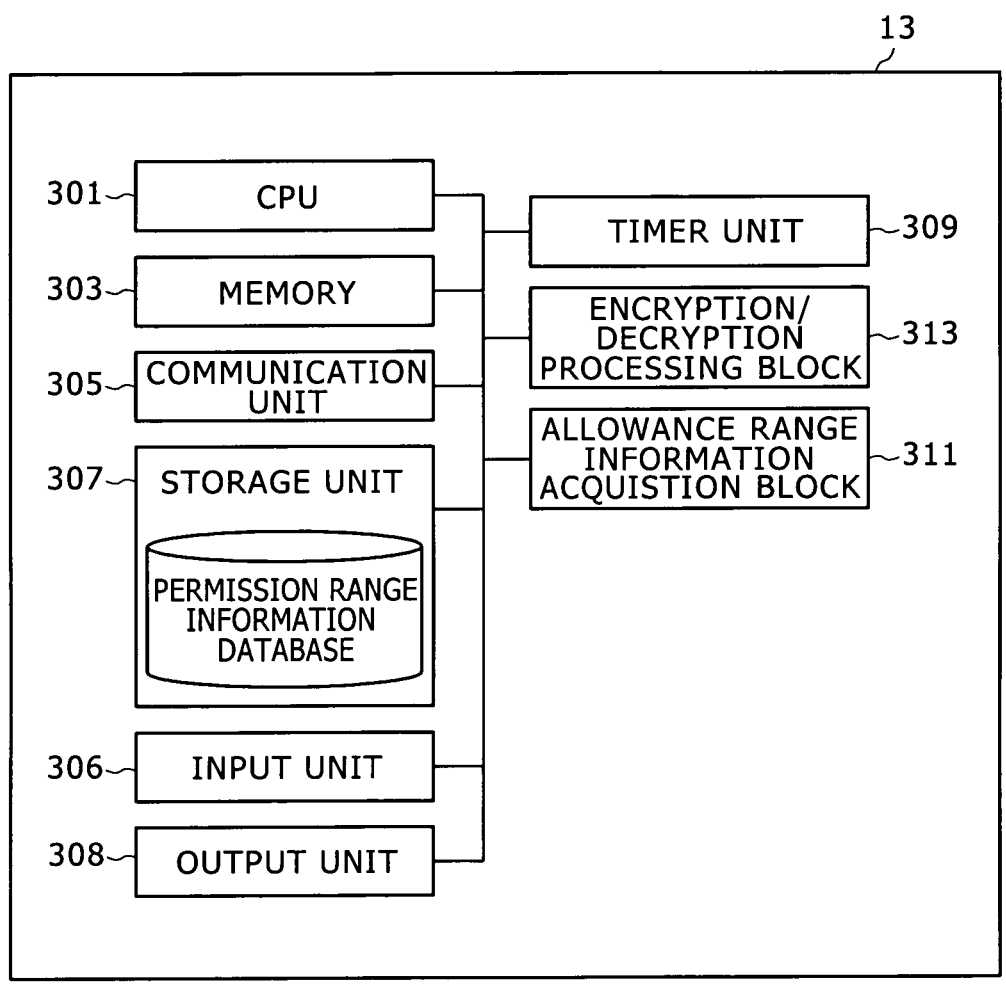
FIG. 4 is a block diagram approximately illustrating an exemplary configuration of a time server associated with the first embodiment.

The following describes the time server 13 practiced as the first embodiment with reference to FIG. 4. FIG. 4 is a block diagram illustrating an exemplary configuration of the time server 13 associated with the first embodiment.

As shown in FIG. 4, the time server 13 has a CPU 301, a memory 303, an input unit 306, a storage unit 307, an output unit 308, a communication unit 305, a timer unit 309, an allowable range information acquisition block 311, and an encryption/decryption block 313, for example.

The CPU 301, functioning as a computation unit and a control unit, controls each of the components of the time server 13. The memory 303 is based on a RAM, a ROM, or a cache memory and temporarily stores various kinds of data necessary for the processing by the CPU 301 and operation programs of the CPU 301.

The communication unit 305 provides a communication interface configured by a communication line, a communication circuit, and a communication device, for example. The communication unit 305 is capable of transmitting and receiving time information and various control signals with other external devices such as the content processing apparatus 10, for example, through the network 5.

The storage unit 307 is a data storage unit constituted by a hard disk drive or a flash memory for example, storing various data such as programs and content data, for example. This storage unit 307 stores an allowable range information database (DB) containing allowable range information TTL, for example.

The timer unit 309 generates and output correct time information. Correct time denotes a time that matches the current time. Namely, the timer unit 309 outputs the time information that always matches the current time.

The timer unit 309 has tamper resistance and is constituted by a reliable clock having anti-falsification means, thereby preventing any user from analyzing the operation of the timer unit 181 and falsifying and forging the internal data.

The allowable range information acquisition block 311 extracts, in time setting, allowable range information TTL from the allowable range information DB stored in the storage unit 307 by use of the service ID (SerID) contained in the data received from the content processing apparatus 10 as the main key. These allowable range information TTL and SerID will be described later in detail.

The encryption/decryption block 313 encrypts/decrypts the data to be transmitted and received with the content processing apparatus 10 for example by use of the public key or the private key of the time server 13. It should be noted that this encryption/decryption may be executed by use of a valid common key with the content processing apparatus 10. The encrypted data is transmitted via the communication unit 305, for example.

The allowable range information acquisition block 311 and the encryption/decryption block 313 are each implemented by one or more modules that become executable when installed in the storage unit 114 beforehand. Alternatively, the allowable range information acquisition block 311 and the encryption/decryption block 313 may also be implemented by Java (trademark) applets that need not be installed, for example.

(Time Setting Method)

Figure 5:
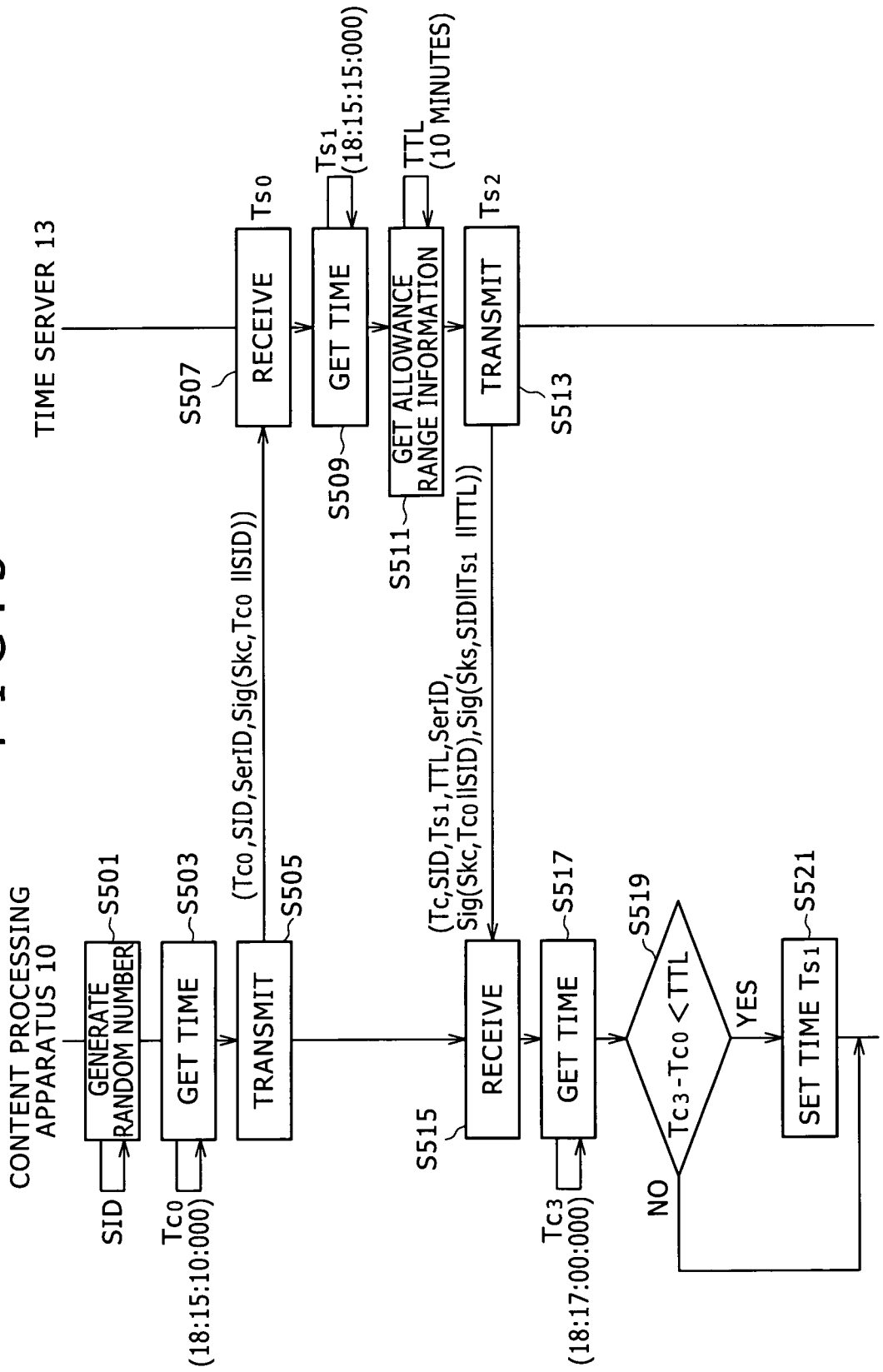
FIG. 5 is a sequence diagram approximately illustrating processing by a time setting method associated with the first embodiment.

The following describes a time setting method associated with the first embodiment with reference to FIG. 5. FIG. 5 is a sequence diagram approximately illustrating this time setting method.

As shown in FIG. 5, the time setting method associated with the first embodiment is executed between the content processing apparatus 10 and the time server 13. The time setting method associated with the first embodiment will be described below by use of an example in which there is, but not exclusively, only one content processing apparatus 10. The details will be described later.

In the time setting method associated with the first embodiment starts when the content processing apparatus 10 generates random number SID (S501). Random number SID is generated when a request for time setting comes from a server or another content processing apparatus 10, for example, details thereof being described later.

The above-mentioned random number SID is identification information for use, but no exclusively, in the execution of the time setting method. For example, random number SID may also be used to delay transmission timing, for example.

Next, the content processing apparatus 10 gets time $T_{c0}$ through the timer unit 181 (S503). As shown in FIG. 5, the content processing apparatus 10 gets "18:15:10:000" as time $T_{c0}$, for example (S503).

Having obtained the time (S503), the content processing apparatus 10 transmits time $T_{c0}$, random number SID, service ID (SerID), and Sig ($S_{kc}$, $T_{c0}\|SID$) (hereafter referred to as client signature Sig) obtained by encrypting time $T_{c0}$ and random number SID by the private key of the content processing apparatus 10 to the time server 13 via the network 5 (S505). These time $T_{c0}$, random number SID, and service ID (SerID) are equivalent to master time request information for requesting the time (master time) counted by the time server 13 (master apparatus), for example.

It should be noted that the time $T_{c0}$, random number SID, and SerID associated with the first embodiment will be described by use of an example in which raw data is transmitted; alternatively, however, the first embodiment is also executable when the data encrypted by the common key between the content processing apparatus 10 and the time server 13 is transmitted or data transmission is executed after mutual authentication by use of OTP (One Time Password) by separately generating a random number (or a challenge code), for example.

The content processing apparatus 10 practiced as the first embodiment will be described by use of an example in which time $T_{c0}$ is transmitted to the time server 13 via the network 5; alternatively, however, the first embodiment is also executable when random number SID and SerID are transmitted except for time $T_{c0}$, for example.

The content processing apparatus 10 practiced as the first embodiment executes transmission processing (S505) after time acquisition processing (S503); alternatively, when transmitting the information except for time $T_{c0}$ to the time server 13, the content processing apparatus 10 may execute transmission processing (S505) before the time acquisition processing.

Next, having received the above-mentioned time $T_{c0}$, random number SID, SerID, and client signature Sig (S507), the time server 13 decrypts the received client signature Sig by the public key of the content processing apparatus 10 to authenticate whether the user who has operated the content processing apparatus 10 is an authorized user. It should be noted that the first embodiment is also executable when the processing of detecting data falsification at the time of reception thereof by hashing the data before being transmitted.

After the authentication, the time server 13 gets time $T_{s1}$ by the timer unit 309 of the time server 13 (S509). If this time $T_{s1}$ satisfies a predetermined condition, it is set as the reliable time of the content processing apparatus 10. It should be noted that, as shown in FIG. 5, the time server 13 gets "18:15:15:000" as time $T_{s1}$ (S509). The timer unit 309 has a tamper-proof structure.

The time server 13 gets the above-mentioned time $T_{s1}$ (S509) and gets allowable range information TTL (S511). This allowable range information TTL can be set for each service. The allowable range information acquisition block 311 of the time server 13 accesses an allowable range information data (DB), not shown, stored in the storage unit 307 by use of SerID as the main key to get allowable range information TTL corresponding to the above-mentioned SerID (S511).

It should be noted that term "access" as used herein generically denotes the information processing to be executed via the network 5 for using the system, the connection to a server or the content processing apparatus 10, the reference of files, the storage of files, the deletion of files, or changes of files, for example.

Allowable range information TTL is used to define the range of arrival time in which the data transmitted from the time server 13 to the content processing apparatus 10 is allowed as valid data. Therefore, if the data transmitted from the time server 13 arrives at the content processing apparatus 10 in excess of the time range set to allowable range information TTL, then this data is regarded as having no reliability and the content processing apparatus 10 handles this data as invalid data. Details thereof will be described later.

As shown in FIG. 5, the allowable range information acquisition block 311 of the time server 13 gets allowable range information TTL (10 minutes) on the basis of SerID, for example.

Having receiving the above-mentioned allowable range information TTL from the time server 13 (S511), the time server 13 encrypts random number SID received from the content processing apparatus 10, the above-mentioned time Ts1, and the above-mentioned allowance range information TTL by use of the private key of the time server 13, thereby generating server signature Sig ($S_{ks}$, SID$\|T_{s1}\|$TTL).

Next, after the encryption by the time server 13, the time server 13 transmits raw data having a set of time $T_c$, random number SID, SerID, time $T_{s1}$, and allowable range information TTL, client signature Sig already received from the content processing apparatus 10, and the above-mentioned server signature Sig to the content processing apparatus 10 (S513). It should be noted that the time of transmission at which the above-mentioned information is transmitted is time $T_{s2}$. Further, the first embodiment is also executable when raw data is encrypted by the common key.

The content processing apparatus 10 receives the above-mentioned time $T_c$, random number SID, SerID, time $T_{s1}$, allowable range information TTL, client signature Sig, and server signature Sig transmitted by the time server 13 (S515).

After receiving the above-mentioned information (S515), the content processing apparatus 10 decrypts server Sig by use of the public key of the time server 13 to authenticate whether the above-mentioned information is that transmitted by the authorized time server 13.

When the content processing apparatus 10 has authenticated the received information, then the timer unit 181 gets time $T_{c3}$ that is the received current time (S517).

It should be noted that, as shown in FIG. 5, the timer unit 181 of the content processing apparatus 10 has already acquired "18:17:00:000" as time $T_{c3}$.

Next, the content processing apparatus 10 computes a differential time between time $T_{c0}$ acquired after the generation of random number SID (S501) and time $T_{c3}$ mentioned above.

The content processing apparatus 10 compares the differential time computed above with allowable range information TTL received along with time $T_{c3}$ from the time server 13 (S519).

For example, as shown in FIG. 5, because time $T_{c0}$ is "18:15:10:000" and time $T_{c3}$ is "18:17:00:000", the different time is "1 minute and 50 seconds".

Further, because allowable range information TTL is "10 minutes", the comparison between the above-mentioned differential time and the above-mentioned allowable range information TTL indicates that the latter is greater than the former (S519). This denotes that the data for setting time between the content processing apparatus 10 and the time server 13 has been transmitted and received within a reliable allowable time range, thereby indicating the establishment of a relation $T_{c3}-T_{c0}<$TTL.

If the differential time is found by the above-mentioned comparison (S519) to be within the range specified by the allowable range information, the CPU 102 of the content processing apparatus 10 sets the time counted by the timer unit 181 to time $T_{s1}$ (S521).

If a delay of the transmission is caused by a transmission interference such as data intercept during transmission of the data containing time $T_{s1}$ from the time server 13 via the network 5, the data is, by adding allowable range information TTL to the data, invalidated if the delay is over the time specified in allowable range information TTL, thereby preventing any illegal time setting attempt. Conventionally, the time of the content processing apparatus 10 is set as a valid time even if a delay occurs in transmission data, so that content can be reproduced in an unauthorized manner.

For example, conventionally, assume that time $T_c$ of the content processing apparatus 10 be "09:50" and Ts of the time server 13 be "10:00 minute" and the transmission data transmitted from the time server 13 to set time $T_c$ of the content processing apparatus 10 be delayed by three hours.

Then, if time $T_c$ of the content processing apparatus 10 is set to time $T_s$ without delay the current time $T_c$ of the content processing apparatus 10 is "13:00"; if a delay of three hours occurs, the current time $T_c$ of the content processing apparatus 10 is "10:00".

Consequently, if the license expiration time of the content held in the content processing apparatus 10 is set "up to 13:00" for example at the time of purchase of the content, then the content processing apparatus 10 may possibly execute illegal processing of content reproduction for additional three delay hours.

The timer unit 181 of the content processing apparatus 10 starts new timer processing from set time $T_{s1}$. Namely, time $T_c$ of the content processing apparatus 10 can be set to reliable time $T_s$ counted by the time server 13.

Thus, if the content processing apparatus 10 reproduces content purchased with license, the timer unit 181 is able to check the use time limit specified at the time of license purchase by the above-mentioned time $T_s$, thereby preventing unauthorized use from being practiced.

Figure 6:
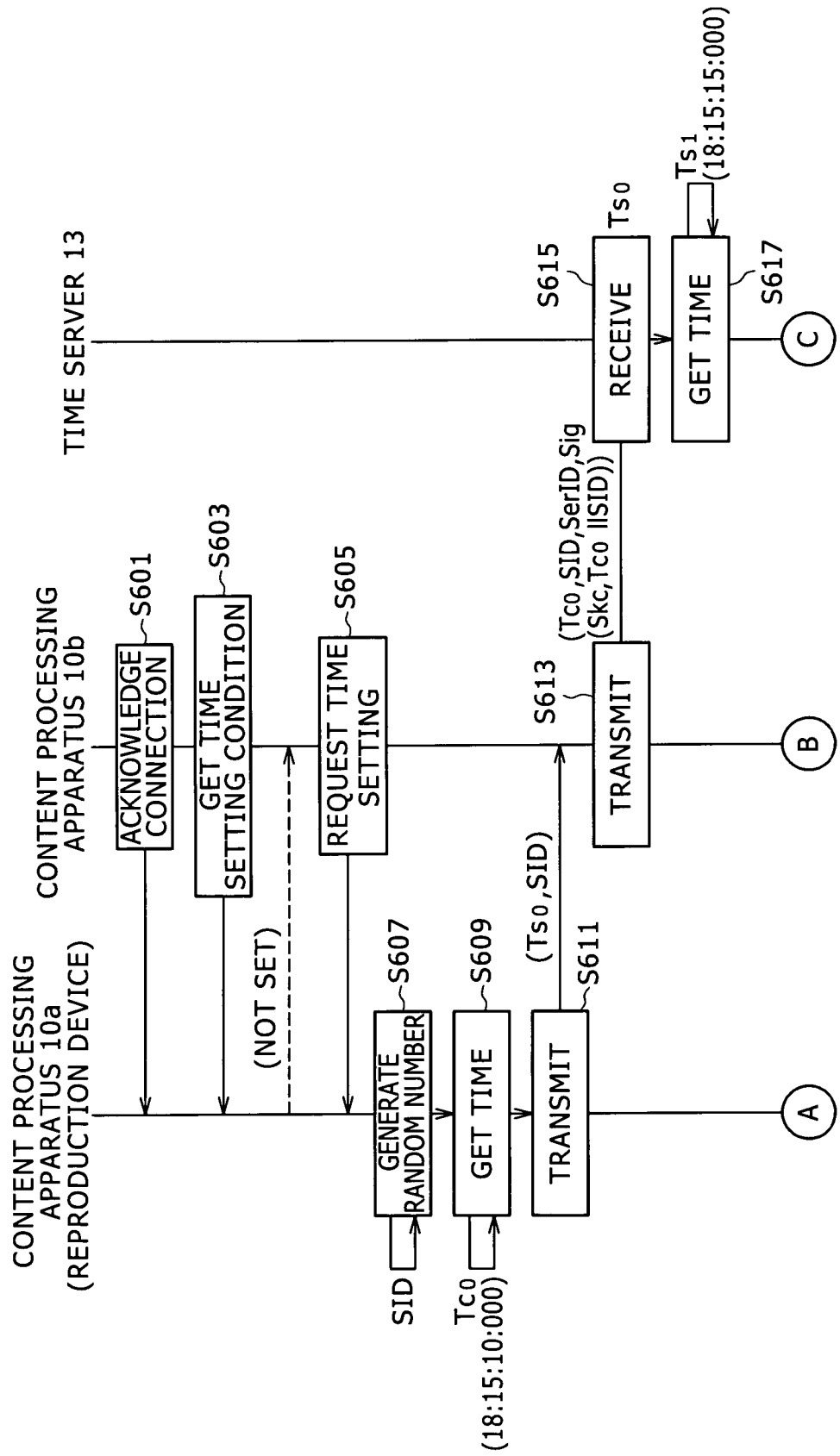
FIG. 6 is a sequence diagram approximately illustrating a time setting method practiced as a second embodiment of the invention.
Figure 7:
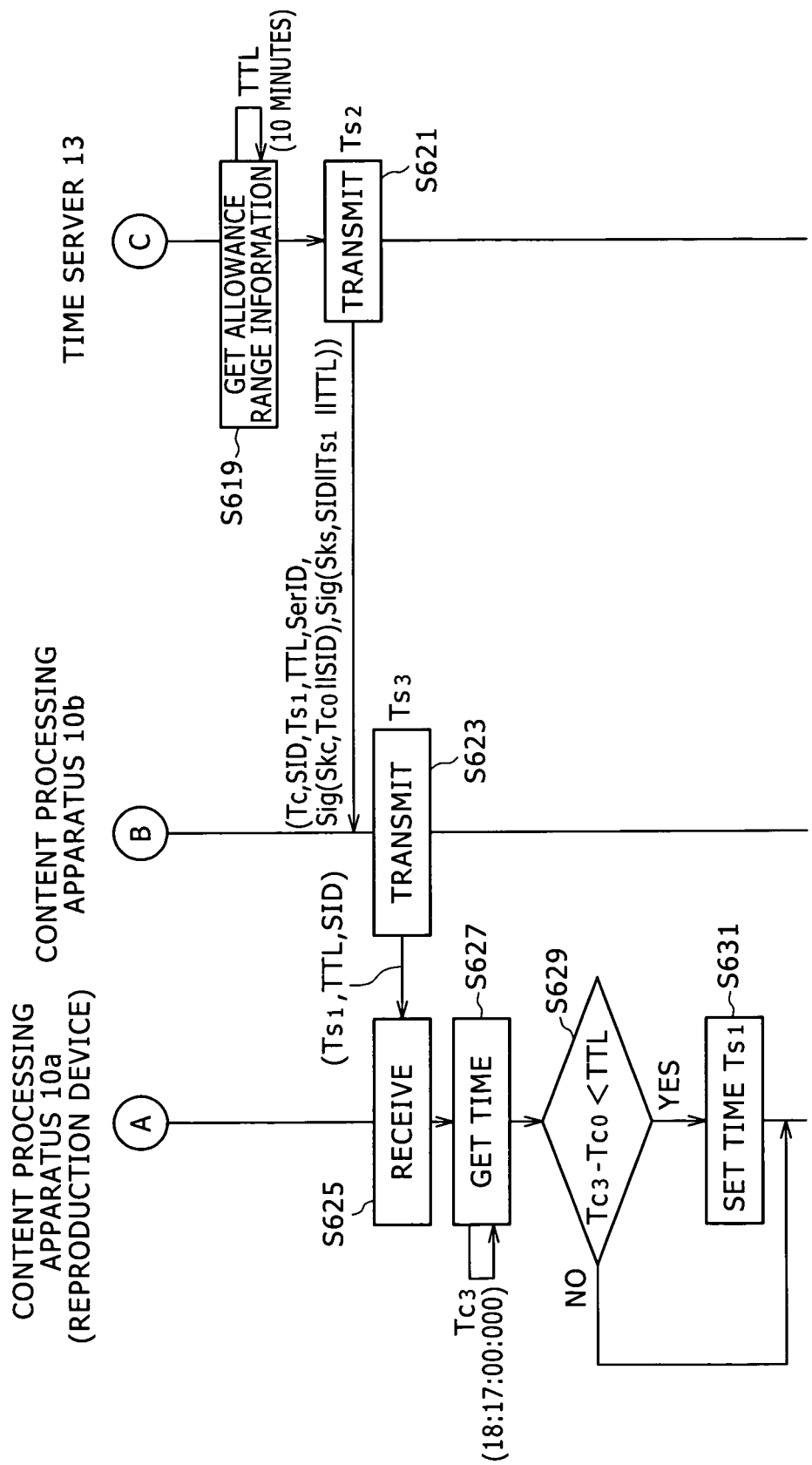
FIG. 7 is another sequence diagram approximately illustrating the time setting method associated with the second embodiment.

The following describes a time setting method practiced as a second embodiment of the invention with reference to FIGS. 6 and 7. FIGS. 6 and 7 are sequence diagrams illustrating the processing of the time setting method associated with the second embodiment. The components of a time setting system 100 practiced as the second embodiment are substantially the same as those of the time setting system 100 practiced as the first embodiment, so that their detail description will be skipped.

As shown in FIG. 6, the time setting method associated with the second embodiment is executed between a content processing apparatus 10a, a content processing apparatus 10b, and a time server 13. It should be noted that the content processing apparatus 10a associated with the second embodiment is a device that is capable of reproducing the content purchased with license by the content processing apparatus 10b.

With the time setting method according to the second embodiment, it is necessary beforehand that the content to be reproduced by the content processing apparatus 10a be selected by the user through an input unit 106 of the content processing apparatus 10b.

Because the content data is held in the content processing apparatus 10b that license-purchased this content data, the content cannot be reproduced on the content processing apparatus 10a as it is.

Therefore, for the reproduction of the content, the content processing apparatus 10a and the content processing apparatus 10b must be interconnected with a USB cable for example to transfer the data such as content data from the content processing apparatus 10b to the content processing apparatus 10a.

It should be noted that the following description will be made by use of an example in which the content processing apparatus 10a and the content processing apparatus 10b associated with the second embodiment are interconnected with a USB cable; alternatively, however, these apparatuses may be interconnected with a cable such as RS-232C or a cable such as compliant with 100Base-TX in which data can be transferred by Ethernet (trademark), for example.

Further, by providing a communication unit 110 with network communication capabilities that allow the content processing apparatus 10a to transmit and receive data via the network 5, the second embodiment is also practicable with the content processing apparatus 10a and the content processing apparatus 10b interconnected in a remote manner.

When the content processing apparatus 10a and the content processing apparatus 10b are interconnected, the content processing apparatus 10b transmits acknowledgement of connection to the content processing apparatus 10a (S601).

The acknowledgement of connection from the content processing apparatus 10b is made by a polling operation that starts at predetermined time intervals, for example. In the processing of acknowledgement of connection, a connection request signal for example for the establishment of connection is transmitted from the content processing apparatus 10b to the content processing apparatus 10a and a connection request response signal for example is transmitted from the content processing apparatus 10a to the content processing apparatus 10b, upon which acknowledgement of connection is completed (S601).

It should be noted that the acknowledgement of connection (S601) associated with the second embodiment is also practicable in an example in which a pass phrase is generated as required to execute mutual authentication and establishment of connection between the content processing apparatus 10a and the content processing apparatus 10b.

When the acknowledgement of connection has been completed (S601), the content processing apparatus 10b requests time setting status information to check the time of the content processing apparatus 10a for reliability (S603).

If the time setting status information acquired by the content processing apparatus 10b does not indicate the status set with the time having reliability, then the content processing apparatus 10b requests the content processing apparatus 10a for executing time setting (S605).

It should be noted that the time setting status information according to the second embodiment is equivalent to the status information for example set with a time counted by the time server 13. Therefore, once the time of the time server 13 is set, the time setting status information indicates the status set with the reliable time.

However, if the power supply based on battery to a timer unit 181 is removed thereafter, the subsequent time has reliability no more, so that the time setting status information does not indicate the status of reliable time.

In the above-mentioned example, in response to the request by the content processing apparatus 10b for time setting status information, the content processing apparatus 10a transmits the requested time setting status information regardless of whether the reliable time is set to the status. Alternatively, if there is no status, the content processing apparatus 10a may not transmit the time setting status information to the content processing apparatus 10b, for example. After passing of a predetermined period time, the content processing apparatus 10b determines that no status is set to the time setting status information and requests time setting (S605).

When the time setting request (S605) comes, the content processing apparatus 10a first generates random number SID (S607). It should be noted that the generation of random number SID associated with the second embodiment is triggered by each time setting request made after the connection to the content processing apparatus 10b; alternatively, the generation of random number SID may be triggered by each request from the time server 13 or the distribution server 20.

The above-mentioned random number SID is the identification information for use in the execution of the time setting processing. Alternatively, the above-mentioned random number SID may be used in staggering transmission timing.

Next, the content processing apparatus 10a gets time $T_{c0}$ from the timer unit 181 (S609). As shown in FIG. 6, the content processing apparatus 10a gets "18:15:10:000" as time $T_{c0}$ (S609).

Having acquired the time (S609), the content processing apparatus 10a transmits time $T_{c0}$ and random number SID to the content processing apparatus 10b via a USB cable for example to the content processing apparatus 10b (S611).

It should be noted that, in the above-mentioned example, the content processing apparatus 10 associated with the second embodiment transmits time $T_{c0}$ and random number SID without encryption; alternatively time $T_{c0}$ and random number SID may be encrypted by the private key of the content processing apparatus 10a before transmission.

Also, in the above-mentioned example, the content processing apparatus 10a generates random number SID on its own; alternatively, the content processing apparatus 10a may transmits a trigger signal for generating random number SID to the content processing apparatus 10b to let the content processing apparatus 10b generate random number, for example.

Having received the data from the content processing apparatus 10a, the content processing apparatus 10b transmits time $T_{c0}$, random number SID, service ID (SerID), and client signature (Sig ($S_{kc}$, $T_{c0}$∥SID)) obtained by encrypting time $T_{c0}$ and random number SID by the private key of the content processing apparatus 10a to the time server 13 via the network 5 (S613). It should be noted that SerID is identification information that is uniquely assigned at the time of license-purchasing of content, of which details will be described later.

In the following description, an example is used in which time $T_{c0}$, random number SID, and SerID are transmitted from the content processing apparatus 10b to the time server 13 without encryption; alternatively, however, if the data encrypted by the common key of the content processing apparatus 10b and the time server 13 is transmitted, a random number (or a challenge code) may be separately generated to execute mutual authentication by one time password (OTP) before transmitting the encrypted data.

In the following description, an example is used in which the content processing apparatus 10b associated with the second embodiment transmits time $T_{c0}$ to the time server 13 via the network 5; alternatively, however, it is practicable to transmit random number SID and SerID except for time $T_{c0}$, for example. The above-mentioned time $T_{c0}$, random number SID, and SerID are equivalent to the master time request information for requesting the time (or the master time) counted by the time server 13 (or the master apparatus), for example.

The data transmitted (S611) by the content processing apparatus 10a is received by the content processing apparatus 10b and transmitted therefrom to the time server 13 via the network 5 (S613).

In the following example, the content processing apparatus 10 associated with the second embodiment executes transmission processing (S611) after time acquisition processing (S609); alternatively, if the transmission is made to the time server 13 except for time $T_{c0}$, the transmission processing (S611) may be executed before the time acquisition processing.

Next, having received the above-mentioned $T_{c0}$, random number SID, SerID, and client signature Sig (S615), the time server 13 decrypts the received client signature Sig by the public key of the content processing apparatus 10b to authenticate that the user who operated the content processing apparatus 10b is an authorized user. It is also practicable to execute processing for detecting data falsification at the time of reception by hashing the data at the time of transmission.

When the authentication has been completed, the time server 13 gets time $T_{s1}$ through the time server 309 of its own (S617). If the above-mentioned time $T_{s1}$ satisfies a predetermined condition, the above-mentioned time $T_{s1}$ is set to the time of the content processing apparatus 10a as a reliable time. It should be noted that, as shown in FIG. 6, the time server 13 gets "18:15:15:000" for example as time $T_{s1}$ (S617). The timer unit 309 has a tamper-proof structure.

As shown in FIG. 7, the time server 13 gets the above-mentioned time $T_{s1}$ (S617) and allowable range information TTL (S619). This allowable range information TTL can be set for each service (SerID). An allowable range information acquisition block 311 of the time server 13 accesses an allowable range information data (DB), not shown, stored in the storage unit 307 by use of SerID as the main key to get allowable range information TTL corresponding to the above-mentioned SerID (S619). It should be noted that SerID is assigned to content in a variety of manners, details of which will be described later.

Allowable range information TTL is used to define the range of arrival time in which the data transmitted from the time server 13 to the content processing apparatus 10 is allowed as valid data. Therefore, if the data transmitted from the time server 13 arrives at the content processing apparatus 10 in excess of the time range set to allowable range information TTL, then this data is regarded as having no reliability and the content processing apparatus 10 handles this data as invalid data. Details thereof will be described later.

As shown in FIG. 7, the allowable range information acquisition block 311 gets allowable range information TTL (10 minutes) on the basis of SerID (S619), for example.

Having receiving the above-mentioned allowable range information TTL from the time server 13 (S619), the time server 13 encrypts random number SID received from the content processing apparatus 10b, the above-mentioned time Ts1, and the above-mentioned allowance range information TTL by use of the private key of the time server 13, thereby generating server signature Sig ($S_{ks}$, SID∥$T_{s1}$∥TTL).

Next, after the encryption by the time server 13, the time server 13 transmits raw data having a set of time $T_c$, random number SID, SerID, time $T_{s1}$, and allowable range information TTL, client signature Sig already received from the content processing apparatus 10b, and the above-mentioned server signature Sig to the content processing apparatus 10b (S621). It should be noted that the time of transmission at which the above-mentioned information is transmitted is time $T_{s2}$. Further, the first embodiment is also executable when raw data is encrypted by the common key.

The content processing apparatus 10b receives the above-mentioned time $T_c$, random number SID, SerID, time $T_{s1}$, allowable range information TTL, client signature Sig, and server signature Sig transmitted by the time server 13.

After receiving the above-mentioned information, the content processing apparatus 10b decrypts server Sig by use of the public key of the time server 13 to authenticate whether the above-mentioned information is that transmitted by the authorized time server 13. After authentication, the content processing apparatus 10b transmits the $T_s$, allowable range information TTL, and random number SID contained in the received data to the content processing apparatus 10a (S623).

When the data from the content processing apparatus 10b has been received by the content processing apparatus 10a (S625), the timer unit 181 of the content processing apparatus 10 gets time $T_{c3}$ that is the current time (S627).

It should be noted that, as shown in FIG. 7, the timer unit 181 of the content processing apparatus 10 gets "18:17:00:000" as time $T_{c3}$ (S627).

Next, the content processing apparatus 10a computes a differential time between time $T_{c0}$ acquired after the generation of random number SID (S607) and time $T_{c3}$ mentioned above.

The content processing apparatus 10a compares the differential time computed above with allowable range information TTL received along with time $T_{c3}$ from the content processing apparatus 10b (S629).

For example, as shown in FIG. 6, because time $T_{c0}$ is "18:15:10:000" and time $T_{c3}$ is "18:17:00:000", the different time is "1 minute and 50 seconds".

Further, because allowable range information TTL is "10 minutes", the comparison between the above-mentioned differential time and the above-mentioned allowable range information TTL indicates that the latter is greater than the former (S629). This denotes that the data for setting time between the content processing apparatus 10 and the time server 13 has been transmitted and received within a reliable allowable time range, thereby indicating the establishment of a relation $T_{c3}-T_{c0}<TTL$.

If the differential time is found by the above-mentioned comparison (S629) to be within the range specified by the allowable range information, the CPU 102 of the content processing apparatus 10a sets the time counted by the timer unit 181 to time $T_{s1}$ (S631).

The timer unit 181 of the content processing apparatus 10a starts counting time from newly set time $T_{s1}$. Namely, the time of the content processing apparatus 10 can be set to reliable time $T_s$ controlled by the time server 13.

As described above, if the content processing apparatus 10 reproduces license-purchased content for example, the use time limit specified at the time of license-purchasing content can be checked by the above-mentioned time $T_s$, thereby preventing unauthorized content use from happening. It should be noted that, conventionally, if a delay occurs in the data transmission by the time server 13, an offset may occur in time $T_s$ of the time server 13 to be set to the content processing apparatus 10 by an amount equivalent to that delay.

Figure 8:
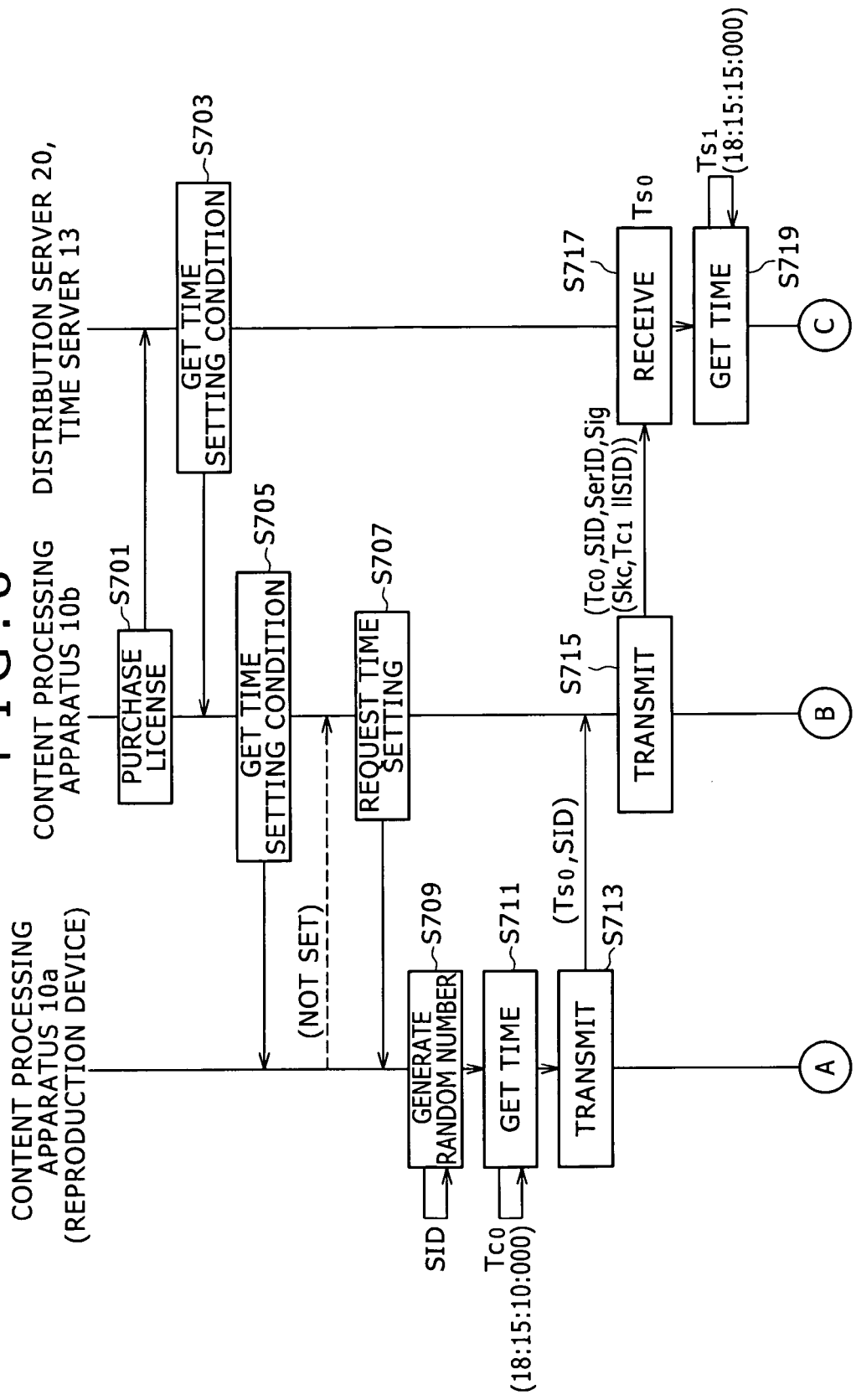
FIG. 8 is a sequence diagram approximately illustrating a time setting method practiced as a third embodiment of the invention.
Figure 9:
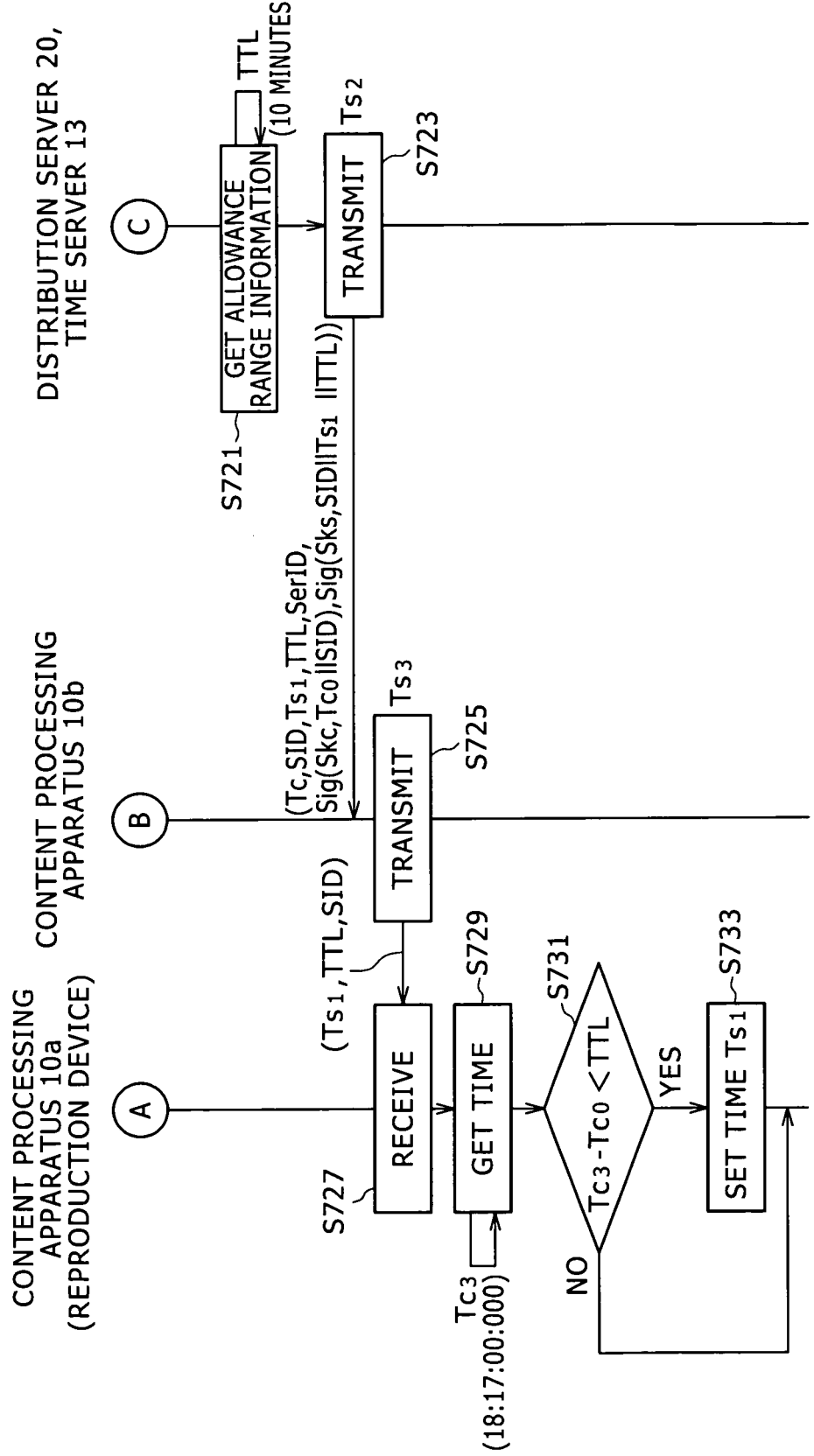
FIG. 9 is a sequence diagram approximately illustrating the time setting method associated with the third embodiment.

The following describes a time setting method practiced as a third embodiment of the invention with reference to FIGS. 8 and 9. FIGS. 8 and 9 are sequence diagrams illustrating the processing of the time setting method associated with the third embodiment. The components of a time setting system 100 practiced as the third embodiment are substantially the same as those of the time setting system 100 practiced as the first embodiment, so that their detail description will be skipped.

As shown in FIG. 8, the time setting method associated with the third embodiment is executed between a content processing apparatus 10a, a content processing apparatus 10b, and a time server 13. It should be noted that the content processing apparatus 10a associated with the third embodiment is a device that is capable of reproducing the content purchased with license by the content processing apparatus 10b.

In the time setting method according to the third embodiment, if the content processing apparatus 10a reproduces content, first the content processing apparatus 10b executes license purchase processing for the content processing apparatus 10a (S701). The following describes this license purchase processing.

First, in order to execute the content license purchase processing, the user must operate the content processing apparatus 10b to register each user with a distribution server 20 in advance. Having received an instruction for user registration from the user through an input unit 106, the content processing apparatus 10b requests the distribution server 20 for user registration. It should be noted that this registration includes new user registration, additional registration of distribution service from, and additional registration of device. In executing this registration request processing, a registration and expiration update block 120 generates user registration request information (for example, group registration request notice, user ID, and credit card number) in response to the entry by the user and transmits the generated user registration request information to the distribution server 20 via the network 5.

Next, a user authentication block 224 of the distribution server 20 authenticates the user who owns (or uses) the requesting content processing apparatus 10b. This user authentication processing checks to see if the user account information included in the above-mentioned user registration request information has an error. If this user authentication fails, the user registration processing is forcibly ended.

If the user authentication has been successfully completed, the content processing apparatus 10b is ready to execute service select processing in the distribution server 20, for example. Next, the content processing apparatus 10b transmits the distribution service form select information with a distribution service form selected by the user to the distribution server 20.

The user of the content processing apparatus 10b selects, through the input unit 106, a desired distribution service form from among a plurality of distribution service forms provided by the distribution server 20 on a GUI screen for example displayed on an output unit 108 of the content processing apparatus 10b.

The distribution service form selected at this moment is distribution service form α "you can listen to jazz for one year without restriction at a rate of $1,000" for example. Service ID (SerID) is assigned to each of the distribution services. It should be noted that one or more distribution service forms may be selected. When a distribution service form has been selected by the user, the content processing apparatus 10b generates distribution service form select information for the selected distribution service form and transmits the generated information to the distribution server 20.

Figure 10:
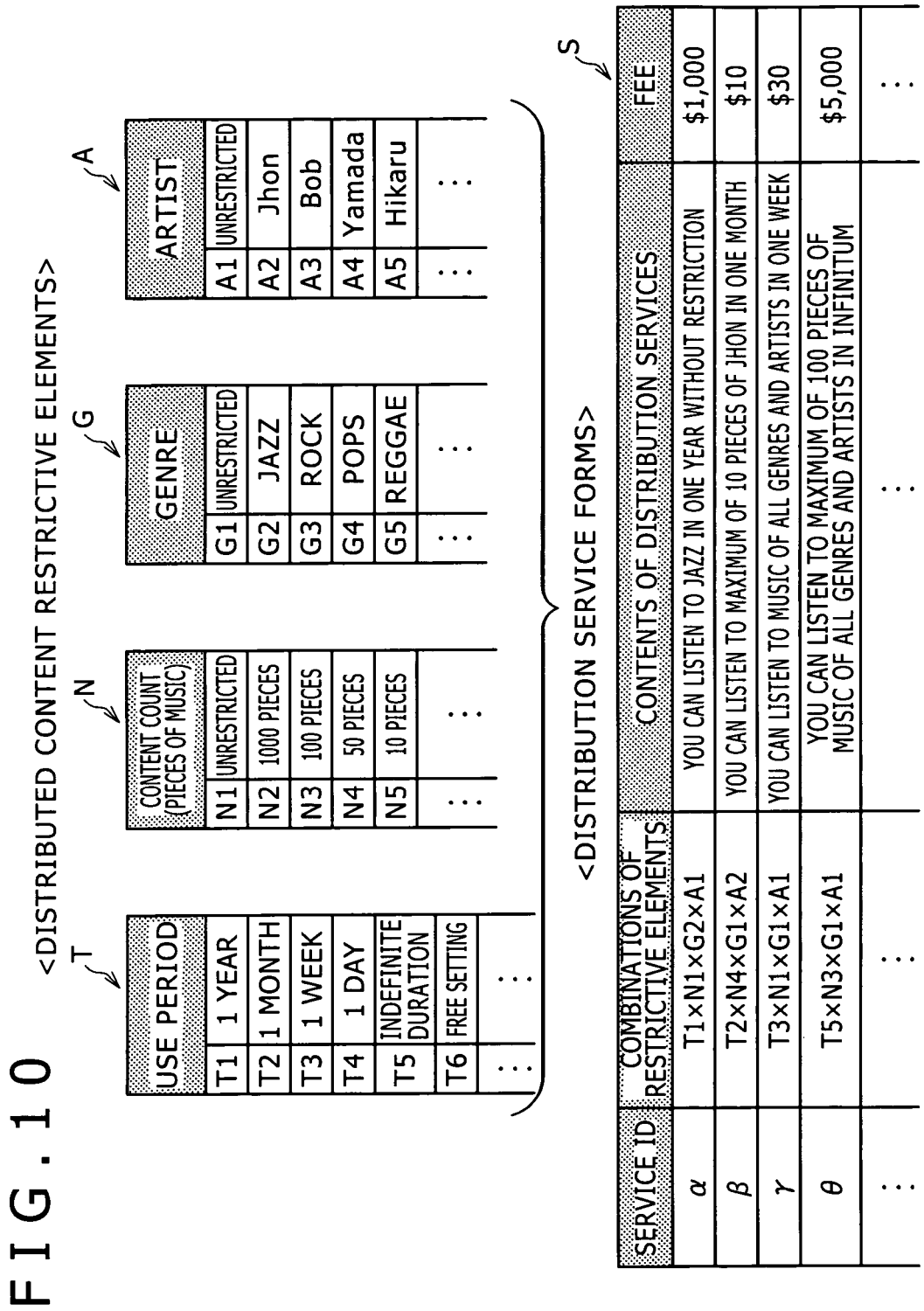
FIG. 10 is a diagram approximately illustrating distribution service forms provided by a distribution server practiced as the third embodiment and an exemplary structure of a distribution service form database.

The following briefly describes an example of distribution service forms provided by the the distribution server associated with the third embodiment and a structure of a distribution service form database with reference to FIG. 10. It should be noted that, in the example shown in FIG. 10, distributed content is music content.

As shown in FIG. 10, the distribution service form database includes a plurality of distributed content restrictive element data table T, N, G, A, and so on and distribution service form information data table S. These distributed content restrictive element data tables T, N, G, A, and so on each include distributed content restrictive element information. The distribution service form information data table S includes the information for specifying combinations of distributed content restrictive elements, the text information indicative of distribution service contents, and the information about the use fees of the above-mentioned distribution services.

The following describes the distribution service forms according to the present embodiment with reference to the above-mentioned data tables of the distribution service form database. Each distribution service form according to the present embodiment is defined by various distributed content restrictive elements (refer to data tables T, N, G, A, and so on) and the distribution service use fee (refer to data table S).

The distributed content restrictive elements restrict the distributed content that can be distributed in each distribution service form. The distributed content restrictive elements include a restrictive element associated with "period of use" of distributed content (hereafter referred to as restrictive element T), a restrictive element associated with distributable "content count" (hereafter referred to as restrictive element N), a restrictive element associated with "genre" of distributed content (hereafter referred to as restrictive element G), and a restrictive element associated with "artist" (hereafter referred to as restrictive element A), for example.

Restrictive element T associated with "period of use" includes an element to restrict a distributed content reproducible period of time to one year (T1), one month (T2), one week (T3), or one day (T4), an element to set the reproducible period of time to "indefinite duration" (T5), and an element to allow the user to set a desired reproducible period of time (T6), for example. Restrictive element N associated with "content count" includes an element to set the reproducible number of pieces of content (or music) to "unrestricted" (N1) and an element to restrict the reproducible number of pieces of content (or music) to 1000 (N2), 100 (N3), 50 (N4), or 10 (N5), for example. Restrictive element G associated with "genre" includes an element to set the genre of distributable music content to "unrestricted" and an element to restrict the genre to jazz (G2), rock (G3), pops (G4), or reggae (G5), for example. Restrictive element A associated with "artist" includes an element to set the artist of distributable music content to "unrestricted" (A1) and an element to restrict the artist to Jhon (A2), Bob (A3), Yamada (A4), or Hikaru (A5), for example.

Further, combinations of these distributed content restrictive elements T, N, G, A, and so on determine the contents of distribution services (refer to data table S). For example, a combination of the above-mentioned distributed content restrictive elements T1, N1, G2, and A1 determines "you can listen to jazz for one year without restriction (namely, within a use period of one year, a plurality of pieces of music content included in the genre of jazz can be received from the distribution server 20 and reproduced on the device-registered content processing apparatus 10 without restriction in content count and artist)".

In addition, setting the distribution service use fee of a price in accordance with the contents of the distribution service concerned to the plurality of contents of distributed content service determined as above determines a plurality of distribution service forms (service ID α, β, γ, θ, and so on). For example, distribution service use fee "$1,000" is set to distribution service contents "you can listen to jazz for one year without restriction" and distribution service form α is determined.

Instead of selecting a distribution service form predetermined with use period, the user is able to select a distribution service form that allows the free setting of use period as indicated by "T6" shown in FIG. 10. In this case, the user enters a desired valid period of the distribution service form into the own content processing apparatus 10b. In response, the content processing apparatus 10b transmits the above-mentioned distribution form select information "T6" set with the desired valid period to the distribution server 20.

A registration management block 222 of the distribution server 20 sets the selected distribution service form to the corresponding user ID and the requesting content processing apparatus 10 on the basis of the received distribution service form select information.

Further, the registration management block 222 of the distribution server 20 generates service ID (SerID) corresponding to the requesting user and the selected distribution service form and assigns the generated SerID to that user ID. This SerID allows the identification of both the user of and the content distribution service itself and the management of allowable range information TTL by bonding it the above-mentioned SerID. It should be noted that, if a plurality of distribution service forms are selected at a time, a plurality of SerIDs are assigned accordingly.

Next, the registration management block 222 of the distribution server 20 generates the valid period information of the SerID assigned to the user on the basis of the use period specified for each distribution service form as described above or the above-mentioned desired valid period for example and registers the generated information, upon which the above-mentioned sequence of registration processing operations are completed.

It should be noted that, as shown in FIG. 11, the above-mentioned user registration is capable of registering a user for each device. This user registration of each device allows the license purchase of content that uses service ID (or SerID) 2162 on a device basis. FIG. 11 illustrates an exemplary structure of a user information database 218 stored in a storage unit 214 of the distribution server 20.

The following briefly describes a user registration database with reference to FIG. 11. As shown in FIG. 11, a data table of the user registration database has item 2161 "user ID", item 2162 "credit card number", item 2163 "service ID", item 2164 "group ID", item 2165 "valid period information" (item 2166 "start time" and item 2167 "end time"), and item 2168 "device ID".

User IDs are written to item 2161 "user ID". The user ID is an identification code that each user to be registered in the content distribution service can select as desired.

To item 2162 "credit card number", the credit card number of each registered user is written. This credit card number functions as a password for user authentication and a billing destination in charging service fees.

These user ID and credit card number constitute the user account information of each user registered in the content distribution service. In addition to these user ID and credit card number, the name, postal address, age, telephone number, gender, occupation, charging method, password, music preference, and other user information may be included in the user account information.

To item 2163 "service ID", the service ID of a distribution service form selected by each registered user is written. This service ID (or SerID) is uniquely attached on a distribution service form basis. The distribution server 20 associated with the third embodiment allows the same user to select a plurality of distribution service forms to concurrently use the distribution services based on the selected distribution service forms.

To item 2164 "group ID", the group ID corresponding to the distribution service form selected by each registered user is written. This group ID is uniquely assigned in unit of "distribution service form selected by each user registered in the distribution server 20" as described above. Hence, another group ID is assigned for another user and another group ID is assigned for another distribution service form selected by the user. To be more specific, as shown in FIG. 11, three different group IDs "group ID-A1", "group ID-A2", and "group ID-A3" are assigned to user A registered in three different distribution service forms. Two different group IDs "group ID-B1" and "group ID-B2" are assigned to user B registered in two different distribution service forms. Because user A and user B are different, "group ID-A1" assigned to user A and "group ID-B1" assigned to user B are not the same if user A and user B are registered in the same distribution service form (service ID α).

To item 2165 "valid period information", the valid period information corresponding to each group ID is written. This valid period information consists of start time information to which item 2166 "start time" is written and end time information to which item 2167 "end time" is written. The start time information is indicative of the time at which the valid period of group ID starts. When the current time passes this start time, the group ID becomes valid. On the other hand, the end time information is indicative of the time at which the valid period of group ID expires. When the current time passes this end time, the group ID becomes invalid. This valid period information is set to each group ID. For example, the valid period information corresponding to "group ID-A1" of user A has start time information "2004.1.1 00:00:00" and end time information "2005.1.1 00:00:00", indicating that "group ID-A1" is valid for one year. It should be noted that the passing of the above-mentioned start time and end time is determined on the basis of the time counted by the timer unit 181 of the content processing apparatus 10.

To item 2168 "device ID", device IDs are written. The device ID is uniquely assigned to each of the content processing apparatuses 10 each at least having content recording or reproduction capabilities. Each content processing apparatus 10 is uniquely identified by this device ID. The device ID includes a terminal ID and a media ID for example. The terminal ID is uniquely assigned to each content processing apparatus 10 constituted by an information processing apparatus such as a PC for example. The media ID is uniquely assigned to each storage medium of the content processing apparatus 10 constituted by a recording device, a PD, or the like. In the third embodiment, the terminal ID is used as the device ID, for example.

To item 2168 "device ID", the device ID of the content processing apparatus 10 in the registration processing to be described later is written as related with the group ID. Consequently, the content processing apparatus 10 is registered as a device. This device registration must be executed for each distribution service form selected by the registered user, for example.

By use of the content processing apparatus 10 device-registered for each distribution service form, the registered user is able to receive the provision of distribution services of distribution service forms to which the content processing apparatus 10 is related. To be more specific, in the example of FIG. 11, three "terminal IDs 1, 2, and 3" are related with "group ID-A1" representative of "distribution service form α" of "user A". Of a plurality of content processing apparatuses 10 of user A, user A is able to use the three content processing apparatuses 10 assigned with these "terminal IDs 1, 2, and 3" to receive the provision of the service of "distribution service form α". However, because "group ID-A2" representative of "distribution service form β" of "user A" are related only with two "terminal IDs 1 and 2", user A is able to receive the provision of the service of "distribution service form β" by use of the two content processing apparatuses 10 assigned with these "terminal IDs 1 and 2"; but user A cannot receive the provision of the service of "distribution service form α" by use of the content processing apparatus 10 assigned with "terminal ID3".

When the user registration has been completed, the user is able to subsequently access the distribution server 20 via the content processing apparatus 10b to license-purchase desired content (S701).

It should be noted that, at the time of license purchasing, SerID is assigned to desired content as attribute information and the valid period of the content is managed by this SerID. Further, at the time of license purchasing, the charging processing corresponding to the selected distribution service form is executed realtime or in a batch manner.

It should be noted that a service by which the user is able to listen to music at a monthly fixed rate without restriction may be set for example as a distribution service form. Therefore, the charging processing in this step may be executed on a fixed-charge, prepaid basis rather than on a conventional metered rate basis in accordance with the number of pieces of distributed content or amount of data.

When the user registration has been completed, a registration and expiration update block 120 of the requesting content processing apparatus 10b securely stores the SerID and valid period information received from the distribution server 20 into the content processing apparatus 10b by encrypting these pieces of information. These group ID and valid period information are written to reproduction permission ID list L stored in the storage unit 114 for example as related with each other.

When the content processing apparatus 10b has executed the license purchase processing on behalf of the content processing apparatus 10a (S701), the distribution server 20 requests the time server 13 to get time setting status. In response, the time server 13 requests the content processing apparatus 10b for time setting status information for checking to see if the time of the content processing apparatus 10b has reliability (S703).

In response to the request for time setting status information, the content processing apparatus 10b requests the content processing apparatus 10a that is the source of license purchase for the time setting status information (S705).

It should be noted that the following description will be made by use of an example in which the content processing apparatus 10a and the content processing apparatus 10b associated with the third embodiment are interconnected with a USB cable; alternatively, however, these apparatuses may be interconnected with a cable such as RS-232C or a cable such as compliant with 100Base-TX in which data can be transferred by Ethernet (trademark), for example.

Further, by providing a communication unit 110 with network communication capabilities that allow the content processing apparatus 10a to transmit and receive data via the network 5, the second embodiment is also practicable with the content processing apparatus 10a and the content processing apparatus 10b interconnected in a remote manner. It is also assumed that that the connection acknowledge processing (S601) associated with the second embodiment have already been executed.

If the time setting status information acquired by the content processing apparatus 10b has no status set with reliable time, then the content processing apparatus 10b requests the content processing apparatus 10a for time setting (S707).

It should be noted that the time setting status information associated with the third embodiment is substantially the same in configuration as that associated with the second embodiment, so that detail description thereof will be skipped.

When a time setting request comes (S707), the content processing apparatus 10a first generates random number SID (S709). It should be noted that the generation of the random number SID associated with the third embodiment is triggered by each time setting request made after the license purchase (S701) by the content processing apparatus 10b; alternatively, however, this generation may be triggered otherwise.

The above-mentioned random number SID is the identification information for use in the execution of the time setting processing. Alternatively, the above-mentioned random number SID may be used in staggering transmission timing according to a random number SID value.

Next, the content processing apparatus 10a acquires time $T_{c0}$ from the timer unit 181 (S711). As shown in FIG. 8, the content processing apparatus 10a gets "18:15:10:000" as time $T_{c0}$ (S711).

Having acquired the time (S711), the content processing apparatus 10a transmits time $T_{c0}$ and random number SID to the content processing apparatus 10b via a USB cable for example to the content processing apparatus 10b (S713).

It should be noted that, in the above-mentioned example, the content processing apparatus 10 associated with the third embodiment transmits time $T_{c0}$ and random number SID without encryption via a USB cable; alternatively time $T_{c0}$ and random number SID may be encrypted by the private key of the content processing apparatus 10a before transmission.

Also, in the above-mentioned example, the content processing apparatus 10a associated with the third embodiment generates random number SID on its own; alternatively, the content processing apparatus 10a may transmits a trigger signal for generating random number SID to the content processing apparatus 10b to let the content processing apparatus 10b generate random number, for example.

Having received the data from the content processing apparatus 10a, the content processing apparatus 10b transmits a set of raw data of time $T_{c0}$, random number SID, service ID (SerID), and client signature (Sig ($S_{kc}$, $T_{c0}$||SID)) obtained by encrypting time $T_{c0}$ and random number SID by the private key of the content processing apparatus 10a to the time server 13 via the network 5 (S613).

In the following description, an example is used in which time $T_{c0}$, random number SID, and SerID associated with the third embodiment are transmitted from the content processing apparatus 10b to the time server 13 without encryption; alternatively, however, if the data encrypted by the common key of the content processing apparatus 10b and the time server 13 is transmitted, a random number (or a challenge code) may be separately generated to execute mutual authentication by one time password (OTP) before transmitting the encrypted data.

In the following description, an example is used in which the content processing apparatus 10b associated with the third embodiment transmits time $T_{c0}$ to the time server 13 via the network 5; alternatively, however, it is practicable to transmit random number SID and SerID except for time $T_{c0}$, for example. The above-mentioned time $T_{c0}$, random number SID, and SerID are equivalent to the master time request information for requesting the time (or the master time) counted by the time server 13 (or the master apparatus), for example.

The data transmitted (S713) by the content processing apparatus 10a is received by the content processing apparatus 10b and transmitted therefrom to the time server 13 via the network 5 (S715).

In the following example, the content processing apparatus 10 associated with the third embodiment executes transmission processing (S713) after time acquisition processing (S711); alternatively, if the transmission is made to the time server 13 except for time $T_{c0}$, the transmission processing (S713) may be executed before the time acquisition processing.

Next, having received the above-mentioned Tc0, random number SID, SerID, and client signature Sig (S717), the time server 13 decrypts the received client signature Sig by the public key of the content processing apparatus 10b to authenticate that the user who operated the content processing apparatus 10b is an authorized user. It is also practicable to execute processing for detecting data falsification at the time of reception by hashing the data at the time of transmission.

When the authentication has been completed, the time server 13 gets time $T_{s1}$ through the time server 309 of its own (S719). If the above-mentioned time $T_{s1}$ satisfies a predetermined condition, the above-mentioned time $T_{s1}$ is set to the time of the content processing apparatus 10a as a reliable time. It should be noted that, as shown in FIG. 8, the time server 13 gets "18:15:15:000" for example as time $T_{s1}$ (S719). The timer unit 309 has a tamper-proof structure.

As shown in FIG. 9, the time server 13 gets the above-mentioned time $T_{s1}$ and gets allowable range information TTL (S721). This allowable range information TTL can be set for each service (SerID). An allowable range information acquisition block 311 of the time server 13 accesses an allowable range information data (DB), not shown, stored in the storage unit 307 by use of SerID as the main key to get allowable range information TTL corresponding to the above-mentioned SerID (S721).

Allowable range information TTL is used to define the range of arrival time in which the data transmitted from the time server 13 to the content processing apparatus 10 is allowed as valid data. Therefore, if the data transmitted from the time server 13 arrives at the content processing apparatus 10 in excess of the time range set to allowable range information TTL, then this data is regarded as having no reliability and the content processing apparatus 10 handles this data as invalid data.

As shown in FIG. 9, the allowable range information acquisition block 311 requires allowable range information TTL (10 minutes) on the basis of SerID (S721), for example.

Having receiving the above-mentioned allowable range information TTL from the time server 13 (S619), the time server 13 encrypts random number SID received from the content processing apparatus 10, the above-mentioned time Ts1, and the above-mentioned allowance range information TTL by use of the private key of the time server 13, thereby generating server signature Sig ($S_{ks}$, SID||$T_{s1}$||TTL).

Next, after the encryption by the time server 13, the time server 13 transmits a set of raw data of time $T_c$, random number SID, SerID, time $T_{s1}$, and allowable range information TTL, client signature Sig already received from the content processing apparatus 10b, and the above-mentioned server signature Sig to the content processing apparatus 10 (S723). It should be noted that the time of transmission at which the above-mentioned information is transmitted is time $T_{s2}$. Further, the first embodiment is also executable when raw data is encrypted by the common key.

The content processing apparatus 10b receives the above-mentioned time $T_c$, random number SID, SerID, time $T_{s1}$, allowable range information TTL, client signature Sig, and server signature Sig transmitted by the time server 13.

After receiving the above-mentioned information, the content processing apparatus 10b decrypts server Sig by use of the public key of the time server 13 to authenticate whether the above-mentioned information is that transmitted by the authorized time server 13. After authentication, the content processing apparatus 10b transmits the $T_s$, allowable range information TTL, and random number SID contained in the received data to the content processing apparatus 10a (S725).

When the data from the content processing apparatus 10b has been received by the content processing apparatus 10a (S727), the timer unit 181 of the content processing apparatus 10 gets time $T_{c3}$ that is the current time (S729).

It should be noted that, as shown in FIG. 9, the timer unit 181 of the content processing apparatus 10 gets "18:17:00:000" as time $T_{c3}$ (S729).

Next, the content processing apparatus 10a computes a differential time between time $T_{c0}$ acquired after the generation of random number SID (S709) and time $T_{c3}$ mentioned above.

The content processing apparatus 10a compares the differential time computed above with allowable range information TTL received along with time $T_{c3}$ from the time server 13 (S731).

For example, as shown in FIGS. 8 and 9, because time $T_{c0}$ is "18:15:10:000" and time $T_{c3}$ is "18:17:00:000", the different time is "1 minute and 50 seconds".

Further, because allowable range information TTL is "10 minutes", the comparison between the above-mentioned differential time and the above-mentioned allowable range information TTL indicates that the latter is greater than the former (S731). This denotes that the data for setting time between the content processing apparatus 10 and the time server 13 has been transmitted and received within a reliable allowable time range, thereby indicating the establishment of a relation $T_{c3}-T_{c0}<TTL$.

If the differential time is found by the above-mentioned comparison (S731) to be within the range specified by the allowable range information, the CPU 102 of the content processing apparatus 10a sets the time counted by the timer unit 181 to time $T_{s1}$ (S733).

The timer unit 181 of the content processing apparatus 10a starts counting time from newly set time $T_{s1}$. Namely, the time of the content processing apparatus 10 can be set to reliable time $T_s$ controlled by the time server 13.

As described above, setting time $T_s$ of the time server 13 to the time of the content processing apparatus 10 at the time of license purchasing allows the checking of the use valid period specified at the time of license purchasing for example by the above-mentioned reliable time $T_s$, thereby preventing unauthorized content use from happening.

Figure 12:
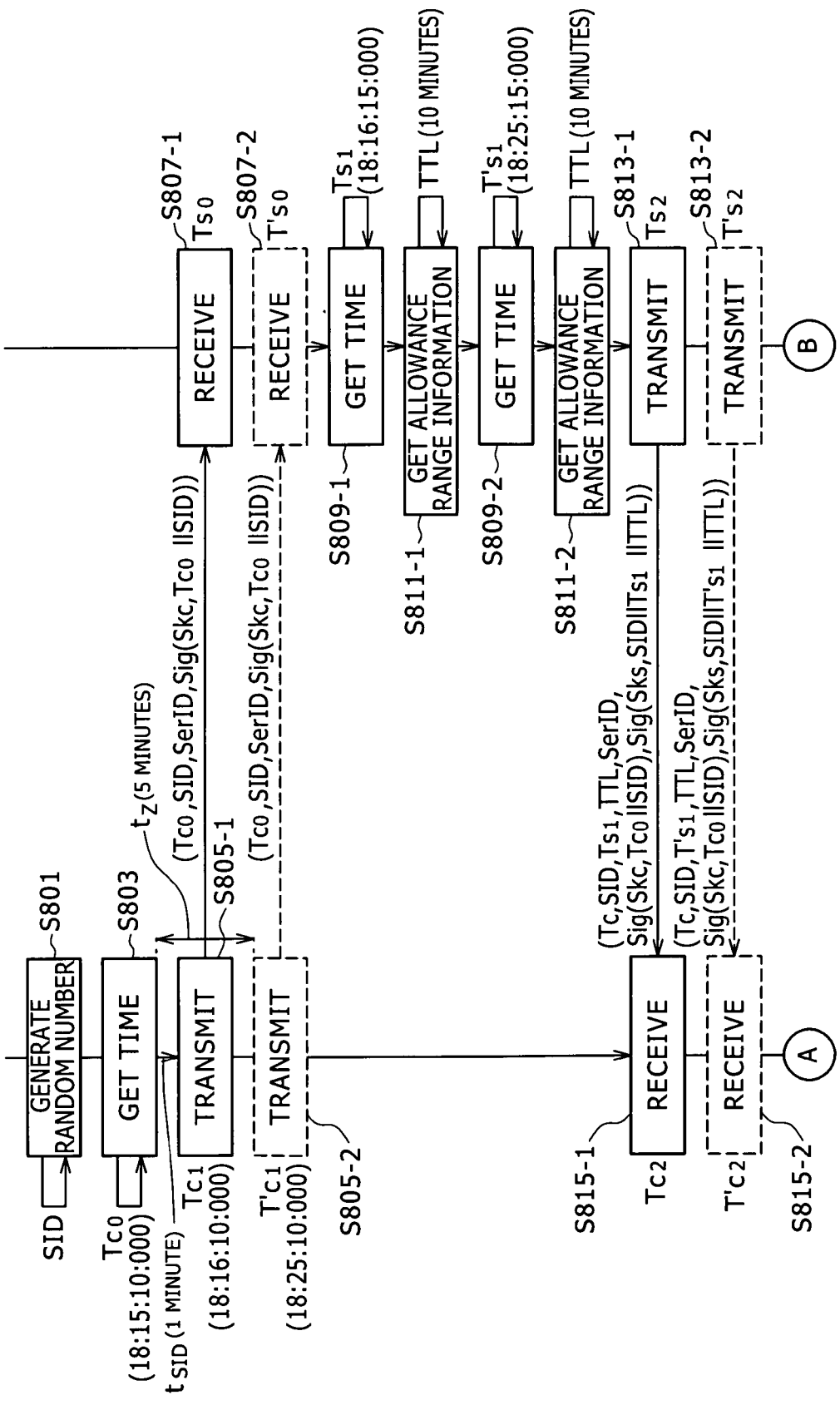
FIG. 12 is a sequence diagram approximately illustrating processing by a time setting method practiced as a fourth embodiment of the invention.
Figure 13:
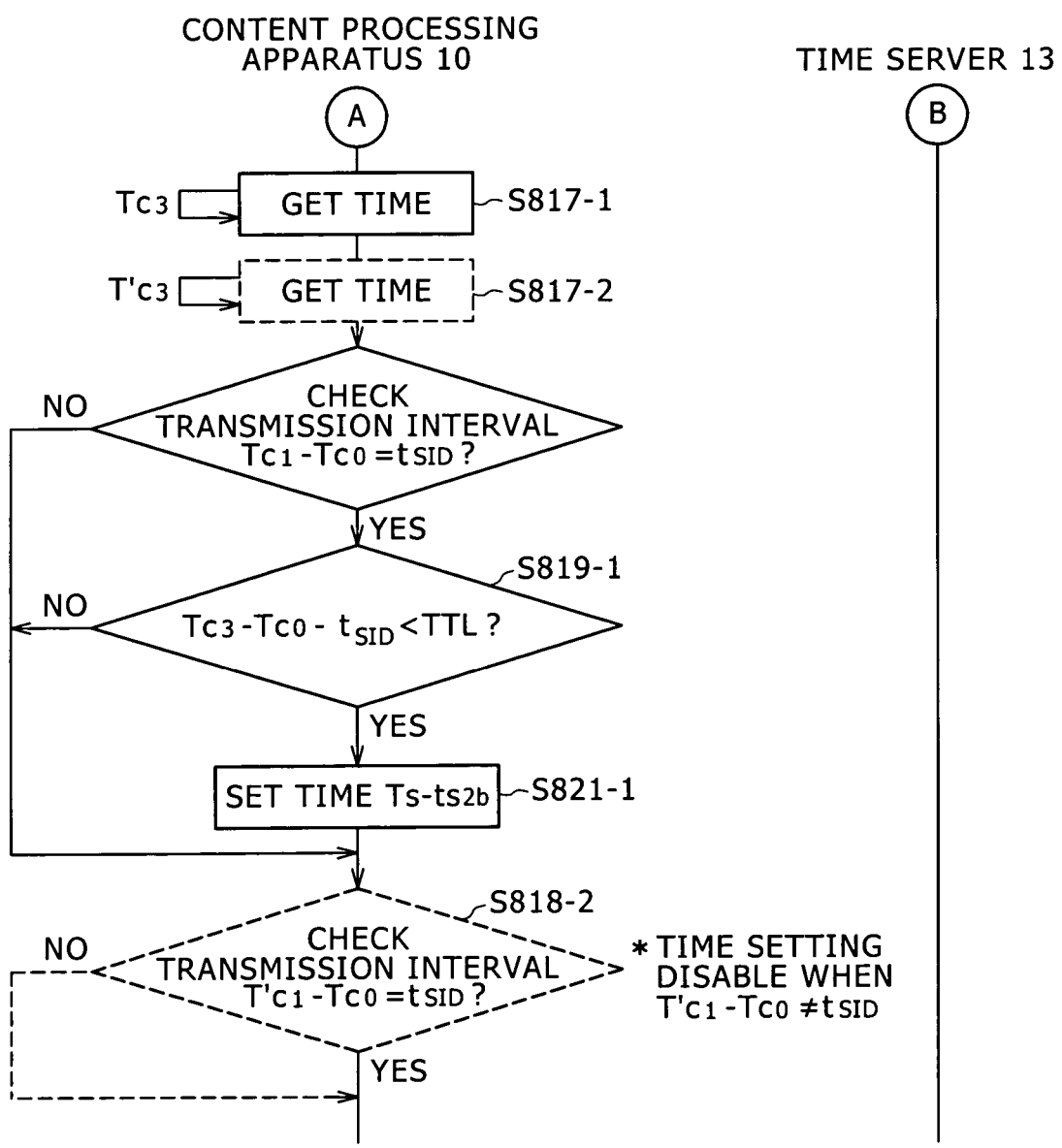
FIG. 13 is another sequence diagram approximately illustrating processing by the time setting method practiced as the fourth embodiment.

The following describes a time setting method practiced as a fourth embodiment of the invention with reference to FIGS. 12 and 13. FIGS. 12 and 13 are sequence diagrams illustrating the processing of the time setting method associated with the fourth embodiment. The components of a time setting system 100 practiced as the fourth embodiment are substantially the same as those of the time setting system 100 practiced as the first embodiment, so that their detail description will be skipped.

The time setting method associated with the fourth embodiment is one application of the time setting method associated with the first embodiment, configured to further enhance the security level in setting the time of the content processing apparatus 10.

The time setting method associated with the fourth embodiment is executed between a content processing apparatus 10 and a time server 13 as with the above-mentioned first embodiment. It should be noted that the time setting method associated with the fourth embodiment is also applicable to each of the time setting methods associated with the second and third embodiments.

As shown in FIG. 12, the time setting method associated with the fourth embodiment starts with the generation of random number SID by the content processing apparatus 10 (S801). It should be noted that, as with the timing of generating the random number SID associated with the first embodiment, the time setting method associated with the fourth embodiment may start when a request for time setting comes from a server or another content processing apparatus 10.

The above-mentioned random number SID is the identification information for use in the execution of the time setting processing. Alternatively, the above-mentioned random number SID may be used in staggering transmission timing according to a random number SID value.

Next, a content processing apparatus 10 gets time $T_{c0}$ from a timer unit 181 (S803). As shown in FIG. 12, the content processing apparatus 10a gets "18:15:10:000" as time $T_{c0}$ (S803).

Having executing time acquisition (S803), the content processing apparatus 10 transmits a set of raw data of time $T_{c0}$, random number SID, service ID (SerID), and client signature (Sig ($S_{kc}$, $T_{c0}$||SID)) obtained by encrypting time $T_{c0}$ and random number SID by the private key of the content processing apparatus 10 to the time server 13 via the network 5 (S805-1).

It should be noted that time $T_{c1}$ of transmission processing (S805-1) for transmission from the content processing apparatus 10 to the time server 13 is a time passing from time $T_{c0}$ in time acquisition (S803) by a random number SID value ($t_{SID}$). It is also practicable to provide $t_{SID}$ obtained by division by a predetermined value on the basis of random number SID.

As shown in FIG. 12, if time $t_{SID}$ is 1 minute for example, time $T_{c1}$ of transmission processing (S803) from the content processing apparatus 10 is "18:16:10:000" obtained by adding time $t_{SID}$ to time $T_{c0}$.

If an attempt is made to execute illegal time setting by delaying the transmission from the content processing apparatus 10 to stagger the transmission timing, a delay of time $t_z$ is placed after the acquisition of time $T_{c0}$ (S803) by the timer unit 181, thereby executing transmission processing (S805-2) at time $T'_{c1}$ as shown in FIG. 12. It should be noted that the above-mentioned time $t_{SID}$, time $T_{c1}$, and time $T'_{c1}$ are temporarily stored in a storage unit 114 in an encrypted form for example.

To be more specific, as shown in FIG. 12 for example, because time $t_z$ is "5 minutes", the content processing apparatus 10 executes transmission processing (S805-2) at time $T'_{c1}$ "3095:10:000". Transmission processing (S805-1) and transmission processing (S805-2) have a time lag equivalent to a difference between time $t_{SID}$ and time $t_z$ (time $t_{SID}$–time $t_z$).

The above-mentioned $t_{SID}$ is computed on the basis of random number SID, so that $t_{SID}$ varies from time to time. Therefore, time $T_{c1}$ of transmission processing (S805-1) from the content processing apparatus 10 varies from time to time. Namely, if an attempt is made to stagger the transmission timing by illegally delaying the transmission processing, this variation in the transmission timing from time to time makes it difficult to match the timing. Especially, if a time interval from the acquisition of time $T_{c0}$ to time $T_{c1}$ is long enough to be not negligible, this configuration provides a valid countermeasure.

It should be noted that the time $T_{c0}$, random number SID, and SerID associated with the fourth embodiment are described by use of an example in which these are transmitted to the time server 13 in the form of raw data; alternatively, however, if the data encrypted by the common key of the content processing apparatus 10 and the time server 13 is transmitted, a random number (or a challenge code) may be separately generated to execute mutual authentication by one time password (OTP) before transmitting the encrypted data.

In the following description, an example is used in which the content processing apparatus 10 associated with the fourth embodiment transmits time $T_{c0}$ to the time server 13 via the network 5; alternatively, however, it is practicable to transmit random number SID and SerID except for time $T_{c0}$, for example.

Next, having received the above-mentioned $T_{c0}$, random number SID, SerID, and client signature Sig (S807-1), the time server 13 decrypts the received client signature Sig by the public key of the content processing apparatus 10 to authenticate that the user who operated the content processing apparatus 10 is an authorized user. It is also practicable to execute processing for detecting data falsification at the time of reception by hashing the data at the time of transmission. It should be noted that the substantially the same processing takes place in the reception processing (S807-2) in which reception is made with a delay in timing, so that the description thereof will be skipped.

After the authentication, the time server 13 acquires time $T_{s1}$ through a timer unit 309 of its own (S809-1). If the above-mentioned time $T_{s1}$ satisfies a predetermined condition, it is set to the time of content processing apparatus 10 as a reliable time. It should be noted that, as shown in FIG. 12, the time server 13 acquires "18:16:15:000" for example as time $T_{s1}$ (S809-1). The timer unit 309 has a tamper-proof structure.

The time server 13 acquires the above-mentioned time $T_{s1}$ and acquires allowable range information TTL (S811-1). It should be noted that the allowable range information TTL associated with the fourth embodiment is substantially the same as the allowable range information TTL associated with the first embodiment, so that the detail description thereof will be skipped.

As shown in FIG. 12, an allowable range information acquisition block 311 of the time server 13 acquires allowable range information TTL (10 minutes) for example on the basis of SerID (S811-1). Likewise, for time acquisition processing (S809-2) and allowable range information TTL acquisition processing (S811-2), time $T'_{s1}$ ("3095:15:000") and allowable range information TTL (10 minutes) are acquired respectively.

Having acquired the above-mentioned allowable range information TTL, the time server 13 encrypts the random number SID received from the content processing apparatus 10, the above-mentioned $T_{s1}$, and the above-mentioned allowable range information TTL by the private key of the time server 13 to generate server signature (Sig($S_{ks}$, SID||$T_{s1}$||TL)).

Next, after the encryption, the time server 13 transmits a set of raw data of time $T_c$, random number SID, SerID, time $T_{s1}$, and allowable range information TTL and client Sig already received from the content processing apparatus 10 to the content processing apparatus 10 via the network 5 (S813-1). It is assumed that the transmission time by the time server 13 be time $T_{s2}$. Further, it is also practicable to encrypt the raw data by the common key before transmission.

On the other hand, in the case of the processing of delayed reception (S807-2), the time server 13 encrypts the random number SID received from the content processing apparatus 10, the above-mentioned time $T'_{s1}$, and the above-mentioned allowable range information TTL by the private key of the time server 13 to generate server signature (Sig($S_{ks}$, SID||$T'_{s1}$||TTL)) and transmits a set of raw data of time $T_c$, random number SID, SerID, time $T'_{s1}$, and allowable range information TTL, and the client signature Sig already transmitted by the content processing apparatus 10 and the above-mentioned server signature Sig to the content processing apparatus 10 via the network 5 (S813-2).

The content processing apparatus 10 receives the above-mentioned time $T_c$, random number SID, SerID, time $T_{s1}$, allowable range information TTL, client signature Sig, and server signature Sig from the time server 13 (S815-1). It should be noted that, in the case of a delay, the content processing apparatus 10 also receives the above-mentioned time $T_c$, random number SID, SerID, time $T_{s1}$, allowable range information TTL, client signature Sig, and server signature Sig (S815-2).

After the reception (S815-1), the content processing apparatus 10 decrypts the above-mentioned server signature Sig by the public key of the time server 13 to authenticate that this server signature Sig is from the authorized time server 13. It should be noted that the authentication processing after the reception processing (S815-2) is executed likewise.

Next, when the received data has been authenticated by the content processing apparatus 10 as shown in FIG. 13, the timer unit 181 of the content processing apparatus 10 acquires time $T_{c3}$ that is the received current time (S817-1).

It should be noted that, as shown in FIG. 13, the timer unit 181 of the content processing apparatus 10 has already acquired "18:17:00:000" as time $T_{c3}$ (S817-2). Time $T'_{c3}$ acquired in the time acquisition processing (S817-2) with a delay is "3097:00:000".

After the time acquisition processing (S817-1), a comparison block 179 executes transmission interval checking operation (S818-1) for checking a time lag from the time acquisition processing (S803) of time $T_{c0}$ to the transmission processing (S805-1).

As shown in FIG. 13, the interval from the time acquisition processing (S803) to the transmission processing (S805-1) is equal to $t_{SID}$, which is "1 minute". This indicates that the condition ($T_{c1}-T_{c0}=t_{SID}$) of the transmission interval check (S818-1) is satisfied and the procedure to subsequent steps (S819-1 and following).

However, a transmission interval check executed when an illegally delayed time setting is requested, the interval from the time acquisition processing (S803) to the transmission processing (805-2) is $t_z$ (5 minutes), so that condition ($T'_{c1}-T_{c0}=t_{SID}$) of the above-mentioned transmission interval check (S8309) is not satisfied, thereby forcibly ending subsequent time setting processing (S821).

Consequently, because the condition is satisfied for the transmission interval check (818-1), a time difference between time $T_{c0}$ acquired by the content processing apparatus 10 after the generation (S801) of random number SID and the above-mentioned time $T_{c3}$. A comparison is made between a time value obtained by subtracting time $t_{SID}$ from the computed time difference and allowable range information TTL of the time server 13 (S819-1).

As a result of the above-mentioned comparison (S819-1), if the above-mentioned time value is found within the above-mentioned allowable range information TTL, the CPU 102 of the content processing apparatus 10 sets the time counted by the timer unit 181 to time $T_{s1}$ (S821-1).

In the time setting method according to the fourth embodiment, the time interval from the time acquisition processing (S803) to the transmission processing (S805) is checked in setting time $T_s$ of the time server 13 to the content processing apparatus 10 and, further, the time interval is determined on the basis of random number SID, so that the setting of correct time for enhancing security is enabled, thereby preventing illegal time setting from happening. Conventionally, the time interval from the time acquisition processing (S803) from the content processing apparatus 10 to the transmission processing (S805) for requesting time setting is extended, so that a time delayed by that extension is possibly set.

For example, if allowable range information TTL is 10 minutes, time $T_s$ of the time server 13 is "12:00:00", and the first acquisition time (S803) by the content processing apparatus 10 is time $T_c$ ("12:00:01"), then, as far as a time difference up to the acquisition (S817) of time $T_{c3}$ again is within allowable range information (10 minutes), the time acquisition (S809) of the time server 13 may be delayed by 6 minutes or 9 minutes for example for normal time setting. If this happens, the usable period of newly license-purchased content is possibly, substantially extended.

The above-mentioned problem is overcome by setting time $T_s$ of the time server 13 at the time of license-purchasing of the content processing apparatus 10 to the time thereof to enable the checking of the content usable period specified at the time of license purchasing by the above-mentioned reliable time $T_s$, thereby preventing attempts of illegal content use from happening. It should be noted that, conventionally, if a delay occurs in the data transmission by the time server 13, time $T_s$ of the time server 13 to be set to the content processing apparatus 10 is possibly shifted by that delay.

While preferred embodiments of the present invention have been described using specific terms, such description is for illustrative purpose only, and it is to be understood that changes and variations may be made without departing from the spirit or scope of the following claims.

In the above-mentioned preferred embodiments of the invention, examples are used in which the random number generation block 178 and the timer unit 181 of the content processing apparatus 10 are implemented by hardware. Alternatively, however, these block and unit may be each implemented by software made up of one or more modules or components.

In the above-mentioned preferred embodiments of the invention, examples are used in which the timer unit 309 of the time server 13 is implemented by hardware. Alternatively, however, the timer unit 309 may be implemented by software made up of one or more modules or components.

The present invention is applicable to time setting methods and time setting systems by which time setting is executed via a network.

What is claimed is:

1. A time setting system, comprising:
a slave apparatus including
a random number generator configured to generate a random number;
a processing circuit configured to compute a random offset time from the random number;
a slave timer configured to output a first slave time; and
a slave transmitter configured to transmit, at a time equal to the first slave time plus the random offset time, a master time information request to a master apparatus via a network, the master time information request including a service identifier that identifies a content distribution service provided to a user, and
said master apparatus including
a master timer configured to output said master time information;
an allowable range information acquisition section configured to acquire allowable range information from a database using the service identifier as a key, the allowable range information defining an allowable time period in which said master time information is valid, wherein the allowable range information stored in the database can vary depending on the service identifier; and
a master transmitter configured to transmit said master time information and said allowable range information to said slave apparatus via a network, wherein
said slave apparatus is configured to obtain a time difference between the first slave time and a second slave time obtained at reception of said master time information; and
when said allowable time period is greater than said time difference, a slave time is set to said master time information.

2. A time setting method, comprising:
generating a random number;
computing a random offset time from the random number;
acquiring a first slave time at a slave apparatus;
transmitting, from said slave apparatus to a master apparatus via a network at a time equal to the first slave time plus the random offset time, a master time information request requesting master time information, the master time information request including a service identifier that identifies a content distribution service provided to a user;
acquiring, upon reception of said master time information request, master time information to which a master time is set and allowable range information from a database using the service identifier as a key, the allowable range information defining an allowable time period in which said master time information is valid, wherein the allowable range information stored in the database can vary depending on the service identifier;
transmitting said master time information and said allowable range information from said master apparatus to said slave apparatus via a network;
acquiring a second slave time at said slave apparatus at the time of reception of said master time information;
obtaining a time difference between the first slave time and the second slave time; and
when said allowable time period is greater than said time difference, setting a slave time to said master time information.

3. A time setting device, comprising:
means for generating a random number and computing a random offset time from the random number;
first time retrieving means for retrieving a first time of the time setting device;
sending a time synchronization request to a server at a time equal to the first time plus the random offset time, the time synchronization request including a service identifier that identifies a content distribution service provided to a user;
receiving means for receiving a server time and a duration time from the server, wherein the duration time is obtained from a database using the service identifier as a key, the duration time defining a time period in which the server time is valid, wherein the duration time stored in the database can vary depending on the service identifier;

second time retrieving means for retrieving a second time after receiving the server time and the duration time; and analyzing means, including a processor, for obtaining a difference between the first time and the second time and comparing the difference with the duration time, wherein the received server time is set as a time of the time setting device when the difference is less than the duration time.

4. A time setting method implemented by a time setting apparatus, the method comprising:

generating a random number and computing a random offset time from the random number;

retrieving a first time of the time setting apparatus;

sending a time synchronization request to a server at a time equal to the first time plus the random offset time, the time synchronization request including a service identifier that identifies a content distribution service provided to a user;

receiving a server time and a duration time from the server, wherein the duration time is obtained from a database using the service identifier as a key, the duration time defining a time period in which the server time is valid, wherein the duration time stored in the database can vary depending on the service identifier;

retrieving a second time after receiving the server time and the duration time; and obtaining, by a processor, a difference between the first time and the second time and comparing the difference with the duration time, wherein the server time is set as a time of the time setting apparatus when the difference is less than the duration time.

5. A time setting device, comprising:

processing circuitry configured to generate a random number and compute a random offset time from the random number;

a first timer configured to retrieve a first time;

a transmitter configured to send a time synchronization request to a server at a time equal to the first time plus the random offset time, the time synchronization request including a service identifier that identifies a content distribution service provided to a user;

a receiver configured to receive a server time and a duration time from the server over a network, wherein the duration time is obtained from a database using the service identifier as a key, the duration time defining a time period in which the server time is valid, wherein the duration time stored in the database can vary depending on the service identifier; and a second timer configured to retrieve a second time after receiving the server time and the duration time, wherein the processing circuitry is further configured to obtain a difference between the first time and the second time and to compare the difference with the duration time, and set the server time as a time of the setting device time when the difference is less than the duration time.

* * * * *